United States Patent
Cui et al.

(10) Patent No.: US 11,925,226 B2
(45) Date of Patent: Mar. 12, 2024

(54) SPECTRALLY SELECTIVE TEXTILE FOR PASSIVE RADIATIVE OUTDOOR PERSONAL COOLING

(71) Applicant: THE BOARD OF TRUSTEES OF THE LELAND STANFORD JUNIOR UNIVERSITY, Stanford, CA (US)

(72) Inventors: Yi Cui, Stanford, CA (US); Shanhui Fan, Stanford, CA (US); Lili Cai, Stanford, CA (US); Alex Y. Song, Stanford, CA (US); Wei Li, Stanford, CA (US); Po-Chun Hsu, Stanford, CA (US)

(73) Assignee: The Board of Trustees of The Leland Stanford Junior University, Stanford, CA (US)

( * ) Notice: Subject to any disclaimer, the term of this patent is extended or adjusted under 35 U.S.C. 154(b) by 433 days.

(21) Appl. No.: 16/267,242

(22) Filed: Feb. 4, 2019

(65) Prior Publication Data
US 2019/0239586 A1    Aug. 8, 2019

Related U.S. Application Data

(60) Provisional application No. 62/626,532, filed on Feb. 5, 2018.

(51) Int. Cl.
*A41D 31/32*        (2019.01)
*A41D 31/14*        (2019.01)
(Continued)

(52) U.S. Cl.
CPC ............ *A41D 31/32* (2019.02); *A41D 31/14* (2019.02); *D01F 1/10* (2013.01); *D01F 1/106* (2013.01);
(Continued)

(58) Field of Classification Search
CPC .... A41D 31/32; A41D 31/14; A41D 2500/20; A41D 2400/26; D04H 13/00;
(Continued)

(56) References Cited

U.S. PATENT DOCUMENTS 5,643,511 A    7/1997  Pluyter et al.
6,309,736 B1 * 10/2001 McCormack ......... B32B 27/302
                                                      442/370
(Continued)

FOREIGN PATENT DOCUMENTS

CN    101230499 B  * 10/2010  ............... D01D 5/08
CN    103290518 A     9/2013
(Continued)

OTHER PUBLICATIONS

Tong et al. "Infrared-Transparent Visible-Opaque Fabrics for Wearable Personal Thermal Management" ACS Photonics. vol 2. pp. 769-778. 2015. (Year: 2015).*
(Continued)

*Primary Examiner* — Jennifer A Gillett

(57) ABSTRACT

A textile includes: (1) a matrix; and (2) particulate fillers dispersed within the matrix. The textile has a transmittance of infrared radiation at a wavelength of 9.5 μm of at least about 40%, and the textile has a weighted average reflectivity of radiation over a wavelength range of 0.3 μm to 2 μm of at least about 40%.

12 Claims, 18 Drawing Sheets

(51) Int. Cl.
  *D01F 1/10* (2006.01)
  *D01F 6/04* (2006.01)
  *D04H 13/00* (2006.01)

(52) U.S. Cl.
  CPC ............... *D01F 6/04* (2013.01); *D04H 13/00* (2013.01); *A41D 2400/26* (2013.01); *A41D 2500/20* (2013.01); *D10B 2401/22* (2013.01); *D10B 2501/04* (2013.01)

(58) Field of Classification Search
  CPC ... D10B 2401/22; D10B 2501/04; D01F 1/04; D01F 1/10; D01F 1/106; D01F 6/04; D01F 6/06; C08K 2003/162; C08K 3/16
  See application file for complete search history.

(56) References Cited

U.S. PATENT DOCUMENTS

| | | | |
|---|---|---|---|
| 6,723,428 | B1 | 4/2004 | Foss et al. |
| 2003/0215632 | A1* | 11/2003 | Jen .................... D02G 3/441 428/375 |
| 2005/0107529 | A1 | 5/2005 | Datta et al. |
| 2006/0099431 | A1 | 5/2006 | Scholz |
| 2008/0071010 | A1 | 3/2008 | Britanak et al. |
| 2009/0156714 | A1 | 6/2009 | Narayan et al. |
| 2015/0096918 | A1 | 4/2015 | Maeda et al. |
| 2016/0326670 | A1 | 11/2016 | Kang et al. |
| 2017/0282173 | A1 | 10/2017 | Huang et al. |
| 2018/0192720 | A1* | 7/2018 | Blackford ................ B32B 5/24 |

FOREIGN PATENT DOCUMENTS

| | | | | |
|---|---|---|---|---|
| CN | 106637454 | A | * 5/2017 | ............... D01F 1/10 |
| JP | S50-065540 | A | 6/1975 | |
| JP | S55-040821 | A | 3/1980 | |
| JP | H02-091215 | A | 3/1990 | |
| JP | H02-104712 | A | 4/1990 | |
| JP | H02-169740 | A | 6/1990 | |
| JP | H03-247626 | A | 11/1991 | |
| JP | H05-117910 | A | 5/1993 | |
| JP | H05-148734 | A | 6/1993 | |
| JP | H05-222614 | A | 8/1993 | |
| JP | H08-199450 | A | 8/1996 | |
| JP | H10-292123 | A | 11/1998 | |
| JP | H11-116822 | A | 4/1999 | |
| JP | 2003-300289 | A | 10/2003 | |
| JP | 2005-076131 | A | 3/2005 | |
| JP | 2005-097754 | A | 4/2005 | |
| JP | 2005-120137 | A | 5/2005 | |
| JP | 2007-511642 | A | 5/2007 | |
| JP | 2011-506748 | A | 3/2011 | |
| JP | 2017-506708 | A | 3/2017 | |
| JP | 2017-081956 | A | 5/2017 | |
| JP | 2017-530265 | A | 10/2017 | |
| KR | 20110071523 | A | 6/2011 | |
| KR | 20160119964 | A | 10/2016 | |
| WO | 2008154691 | A1 | 12/2008 | |
| WO | WO-2014078184 | A1 * | 5/2014 | ............. C09K 11/02 |
| WO | 2013-168717 | A1 | 1/2016 | |
| WO | 2016044609 | A1 | 3/2016 | |
| WO | WO-2017/143222 | A1 | 8/2017 | |
| WO | WO-2018/058062 | A1 | 3/2018 | |

OTHER PUBLICATIONS

PennState Materials Research Institute—"UV-Vis-NIR" https://www.mri.psu.edu/materials-characterization-lab/characterization-techniques/uv-vis-nir#:~:text=Measurements%20in%20the%20ultraviolet%2Fvisible,200%20nm%20to%20800%20nm.&text=The%20near%2DIR%20region%20(NIR,from%20about%20800%2D2500%20nm. (Year: 2021).*

Fluoroplastics (Fluoroplastics vol. 2—Melt Processible Fluoropolymers, The Definitive User's Guide and Data Book). Refractive Index of Polyethylene. (Year: 2015).*

Knovel (Knovel Critical Tables vol. 2). Refractive Index of ZnO. (Year: 2008).*

Hsu et al. "Radiative Human Body Cooling by Nanoporous Polyethylene Textile" Science. vol 353. Issue 6303. pp. 1019-1023. 2016. (Year: 2016).*

LanXess (COLORTHERM® Pigments for Plastics Shade Card). (Year: 2010).*

Pantone ("How do we see color?") https://www.pantone.com/articles/color-fundamentals/how-do-we-see-color#:~:text=The%20human%20eye%20and%20brain,and%20absorbs%20all%20the%20others. (Year: 2021).*

Machine Translation of Ding (CN 106637454 A) from Espacenet.com (Year: 2017).*

TiO2 Refractive Index—Table 13.1 Physical Properties of Polymers Investigated for Anti-Fouling, AF Surfaces. Retrieved from https://app.knovel.com/hotlink/itble/rcid:kpPCAGCCS1/id:kt00XRGKE2/polymer-coatings-guide/physical-properties-polymers (Year: 2018).*

ITO Refractive Index—Physical Properties. Retrieved from https://app.knovel.com/hotlink/itble/rcid:kpHA000003/id:kt0057QHH4/handbook-antistatics/physical-properties (Year: 2007).*

ZnS Properties from Transparent Ceramics Transparent Ceramics—Materials, Engineering, and Applications. (Year: 2020).*

International Search Report and Written Opinion for PCT Application No. PCT/US2019/016554 dated May 24, 2019, 12 pages.

Anderson et al., "Infrared radiative properties and thermal modeling of ceramic-embedded textile fabrics", Biomedical Optics Express, 1698, vol. 8, No. 3, Mar. 1, 2017, pp. 1-14.

Rivero et al., "Nanomaterials for Functional Textiles and Fibers", Nanoscale Research Letters (2015)10:501, pp. 1-22.

Seungsin Lee, "Developing UV-protective Textiles Based on Electrospun Zinc Oxide Nanocomposite Fibers", Fibers and Polymers 2009, vol. 10, No. 3, pp. 295-301.

Boriskina, "Nanoporous fabrics could keep you cool", Science, vol. 353, No. 6303, Sep. 2, 2016, pp. 986-987.

Extended European Search Report for EP Application No. 19746620.4 dated Aug. 12, 2021, 11 pages.

Nilsson et al., "A solar reflecting material for radiative cooling applications: ZnS pigmented polyethylene", Solar Energy Materials and Solar Cells, vol. 28, No. 2, Nov. 1, 1992, pp. 175-193.

Peng et al., "Nanoporous polyethylene microfibres for large-scale radiative cooling fabric", Nature Sustainability, vol. 1, No. 2, Feb. 1, 2018, pp. 105-112.

* cited by examiner

SPECTRALLY SELECTIVE TEXTILE FOR PASSIVE RADIATIVE OUTDOOR PERSONAL COOLING

CROSS-REFERENCE TO RELATED APPLICATION

This application claims the benefit of U.S. Provisional Application No. 62/626,532, filed Feb. 5, 2018, the contents of which are incorporated herein by reference in their entirety.

STATEMENT REGARDING FEDERALLY SPONSORED RESEARCH OR DEVELOPMENT

This invention was made with Government support under contract DE-AR0000533 awarded by the Department of Energy. The Government has certain rights in the invention.

BACKGROUND

Outdoor heat stress poses a serious public health threat and curtails industrial labor supply and productivity, thus adversely impacting the wellness and economy of society. However, an effective and economical method that can provide localized outdoor cooling of the human body without being constrained by humidity and wind levels is lacking.

It is against this background that a need arose to develop embodiments of this disclosure.

SUMMARY

In some embodiments, a textile includes: (1) a matrix; and (2) particulate fillers dispersed within the matrix. The textile has a transmittance of infrared radiation at a wavelength of 9.5 µm of at least about 40%, and the textile has a weighted average reflectivity of radiation over a wavelength range of 0.3 µm to 2 µm of at least about 40%.

In some embodiments of the textile, the matrix includes at least one polyolefin.

In some embodiments of the textile, the matrix includes at least one of polyethylene or polypropylene.

In some embodiments of the textile, the particulate fillers have a peak particle size in a range of about 10 nm to about 4000 nm.

In some embodiments of the textile, the particulate fillers include an inorganic material.

In some embodiments of the textile, the particulate fillers include at least one of a metal oxide, a metal halide, or a metal sulfide.

In some embodiments of the textile, the particulate fillers include at least one of zinc oxide, potassium bromide, cesium iodide, potassium chloride, sodium chloride, or zinc sulfide.

In some embodiments of the textile, a difference in refractive index between the particulate fillers and the matrix is at least about ±5% with respect to a refractive index of the matrix.

In some embodiments of the textile, the transmittance of infrared radiation at the wavelength of 9.5 µm is at least about 60%.

In some embodiments of the textile, the weighted average reflectivity of radiation over the wavelength range of 0.3 µm to 2 µm is at least about 60%.

In some embodiments of the textile, the matrix is porous.

In some embodiments of the textile, a volume percentage of pores within the matrix is at least about 5%.

In some embodiments of the textile, pores within the matrix have a peak pore size in a range of about 10 nm to about 4000 nm.

In some embodiments of the textile, the textile includes a fiber including the matrix and the particulate fillers dispersed within the matrix.

In some embodiments of the textile, the textile includes a film including the matrix and the particulate fillers dispersed within the matrix.

In additional embodiments, a textile includes: (1) a matrix; and (2) particulate fillers dispersed within the matrix. The textile has a transmittance of infrared radiation at a wavelength of 9.5 µm of at least about 40%, and the textile has a peak in reflectivity at a wavelength in the visible range corresponding to a particular color.

In some embodiments of the textile, the particulate fillers include at least one of a metalloid, a metal oxide, or a metal cyanide.

In additional embodiments, a method of regulating a temperature of a human body includes placing the textile of any one of the foregoing embodiments adjacent to the human body.

In further embodiments, a method of forming a porous textile includes: (1) forming a mixture of a solvent, at least one polymer, and particulate fillers, wherein the particulate fillers include an inorganic material having a transmittance of infrared radiation at a wavelength of 9.5 µm of at least about 40%, and the particulate fillers have a peak particle size in a range of about 10 nm to about 4000 nm; (2) extruding the mixture to form a textile including the solvent and the particulate fillers dispersed within the textile; and (3) extracting the solvent from the textile to form the porous textile.

In some embodiments of the method, the at least one polymer includes a polyolefin.

In some embodiments of the method, the particulate fillers include at least one of zinc oxide, potassium bromide, cesium iodide, potassium chloride, sodium chloride, or zinc sulfide.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DESCRIPTION

Figure 1A:
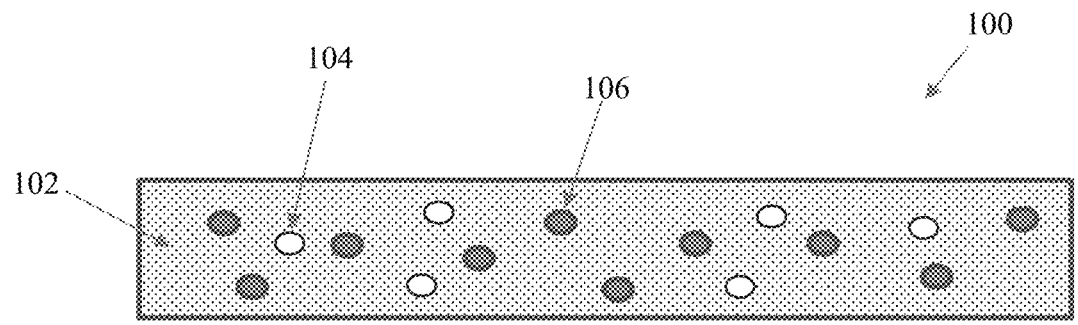
FIG. 1(a). Schematic of a porous film of some embodiments.

Embodiments of this disclosure are directed to spectrally selective textiles. In some embodiments, a solar-reflective, infrared (IR)-transparent, particle-embedded polymeric textile is provided for outdoor wearers and achieves cooling power to maintain thermal comfort under direct sunlight in an outdoor environment.

The heat exchange between a human body and an outdoor environment involves conduction, convection, evaporation and radiation. Maintaining outdoor thermal comfort therefore involves the reduction of heat stress by reducing heat gain and enhancing heat loss. Other approaches mainly focus on the evaporative and convective heat loss of garments to achieve outdoor cooling, but these two heat dissipation pathways both have their own constraints that strongly depend on environment conditions, such as humidity and wind levels. Solar irradiance and thermal radiation pathways have not been adequately considered for an outdoor textile, despite their large contributions to the overall heat exchange. Unlike normal textiles, an IR-transparent textile reflects a high percentage of sunlight with low absorption of IR radiated by the human body to simultaneously reduce input and enhance output of radiative heat transfer without additional energy consumption, so that a wearer feels cooler in an outdoor environment. In addition, a polymeric composite material can be formed into a fiber by extrusion, and a woven textile can be formed from the fiber by weaving, thereby providing comfort and breathability as a next-to-skin textile. Hence, the textile is amenable for production at a large scale. As such, embodiments of this disclosure provide a solar-reflective, IR-transparent textile for outdoor personal cooling, which maintains the comfort of a next-to-skin textile and is also realizable at a large scale.

An IR-transparent textile of some embodiments has a low absorption of IR radiation emitted by a human body, so the IR radiation can be transmitted freely into an environment and result in a wearer feeling cooler. Meanwhile, the textile is provided with particulate fillers dispersed within the textile, which serve to scatter a solar irradiance spectrum so as to provide a cooling effect under direct sunlight. In addition, the textile can be porous, and pores in the textile can render the textile breathable and increase heat dissipation via conduction and convection. The textile can be formed as a porous film embedded with particulate fillers, or can be formed with a fiber-based woven structure. Polymer fibers provided with pores and embedded with particulate fillers can be formed at a large scale by a process such as extrusion and solvent extraction, and woven textiles can be formed from such fibers at a large scale by a process such as weaving.

A textile of some embodiments includes a single polymer or a blend of two or more different polymers. To impart IR transparency in some embodiments, a polymer or a blend of polymers having a low absorption of IR radiation can be used, such as a low absorption of radiation in the mid-IR range of about 4 μm to about 20 μm or about 4 μm to about 16 μm. In such embodiments, suitable polymers include polyolefins, such as polyethylene (PE), polypropylene (PP), and other thermoplastic polyolefins or polyolefin elastomers. In the case of PE, suitable molecular weights can range from low density PE (LDPE), high density PE (HDPE), and ultra-high molecular weight PE (UHMWPE). PE can be blended or at least partially replaced with other polymers, such as PP, polyvinyl chloride (PVC), vinylon, polyacrylonitrile (PAN), polyamide (e.g., nylon), polyethylene terephthalate (PET), polyester, polyvinyl fluoride (PVF), copolymers, other thermoplastic polymers, natural polymers, and so forth. In place of, or in combination with, polyolefins, other polymers having a low absorption of IR radiation can be used, such as polymers substantially devoid of one or more of the following functional groups: C—O; C—N; aromatic C—H; and S=O, and such as polymers with a content of no greater than about 1 mmole/g, no greater than about 0.1 mmole/g, no greater than about 0.01 mmole/g, no greater than about 0.001 mmole/g, or no greater than about 0.0001 mmole/g of one or more of these functional groups. In some embodiments, suitable polymers have a transmittance of IR radiation at a wavelength of 9.5 μm of at least about 30%, at least about 40%, at least about 50%, at least about 60%, at least about 70%, or at least about 80%, and up to about 90%, up to about 95%, up to about 98%, or more. In some embodiments, suitable polymers have a weighted average transmittance of IR radiation over a wavelength range of 7-14 μm of at least about 30%, at least about 40%, at least about 50%, at least about 60%, at least about 70%, or at least about 80%, and up to about 90%, up to about 95%, or more. During formation of the textile, one or more additives can be included, such as anti-oxidants, anti-microbials, colorants or dyes, water wicking agents (e.g., cotton), metals, wood, silk, wool, and so forth. The one or more additives can be dispersed within a polymer or a blend of polymers included in the textile.

A textile of some embodiments also includes particulate fillers dispersed within a matrix of a polymer or a blend of polymers. The particulate fillers provide a contrast in refractive index relative to the polymer or the blend of polymers included in the textile to selectively scatter light in a desired spectrum, and, in particular, to strongly scatter light in the desired spectrum, but with low scattering in the mid-IR range. In some embodiments, the particulate fillers are sized and have a material composition to selectively scatter light in a solar irradiance spectrum in a range of about 300 nm to about 4 μm, encompassing radiation in the visible range of about 400 nm to about 700 nm and radiation in the near-IR range of 700 nm to about 4 μm, thereby providing a cooling effect under direct sunlight. In other embodiments, the particulate fillers are sized and have a material composition to selectively scatter certain wavelengths or colors in the visible range, thereby providing a coloration effect. For example, the particulate fillers (and the textile including such fillers) can have a peak in reflectivity at a particular wavelength in the visible range corresponding to a particular color (e.g., about 450 nm), yielding visual appearance of that particular color (e.g., blue), or can have a peak in reflectivity at another particular wavelength in the visible range corresponding to another particular color (e.g., about 600 nm), yielding visual appearance of that another particular color (e.g., yellow), or can have a peak in reflectivity at another particular wavelength in the visible range corresponding to another particular color (e.g., about 750 nm), yielding visual appearance of that another particular color (e.g., red), and so on.

In some embodiments, a relative difference in refractive index between the particulate fillers and the polymer or the blend of polymers is at least about ±1% with respect to a refractive index of the polymer or the blend of polymers included in the textile (e.g., for visible light measured at 589 nm), such as at least about ±5%, at least about ±8%, at least about ±10%, at least about ±15%, at least about ±20%, at least about ±25%, at least about ±30%, at least about ±35%, at least about ±40%, at least about ±45%, or at least about ±50%. In some embodiments, an absolute difference in refractive index between the particulate fillers and the polymer or the blend of polymers is at least about ±0.01 with respect to the refractive index of the polymer or the blend of polymers included in the textile (e.g., for visible light measured at 589 nm), such as at least about ±0.05, at least about ±0.1, at least about ±0.15, at least about ±0.2, at least about ±0.25, at least about ±0.3, at least about ±0.35, at least about ±0.4, at least about ±0.45, at least about ±0.5, or at least about ±0.55. A refractive index of the particulate fillers can be higher or lower than the refractive index of the polymer or the blend of polymers included in the textile.

Examples of suitable materials of fillers include inorganic materials that have a low absorption of radiation in a range of about 300 nm to about 20 µm, encompassing radiation in the visible range, radiation in the near-IR range, and radiation in the mid-IR range, such as metalloids (e.g., silicon), metal oxides (e.g., zinc oxide and iron oxide), metal halides (e.g., potassium bromide, cesium iodide, potassium chloride, and sodium chloride), metal sulfides (e.g., zinc sulfide), metal cyanides (e.g., Prussian blue), and so forth. In some embodiments, suitable materials for the fillers have a transmittance of IR radiation at a wavelength of 9.5 µm of at least about 30%, at least about 40%, at least about 50%, at least about 60%, at least about 70%, or at least about 80%, and up to about 90%, up to about 95%, up to about 98%, or more. In some embodiments, suitable materials for the fillers have a weighted average transmittance of IR radiation over a wavelength range of 7-14 µm of at least about 30%, at least about 40%, at least about 50%, at least about 60%, at least about 70%, or at least about 80%, and up to about 90%, up to about 95%, or more. The fillers are sized to primarily scatter radiation in the visible range and the near-IR range instead of radiation in the mid-IR range. For example, the fillers can be nano-sized (e.g., as nanoparticles) so as to be comparable to wavelengths of visible light and below wavelengths of mid-IR radiation. In some embodiments, the fillers have an average or a peak particle size in a range of about 10 nm to about 4000 nm, about 1000 nm to about 4000 nm, about 100 nm to about 1000 nm, about 100 nm to about 900 nm, about 100 nm to about 800 nm, about 100 nm to about 700 nm, about 100 nm to about 600 nm, about 100 nm to about 500 nm, about 100 nm to about 400 nm, about 100 nm to about 300 nm, about 500 nm and about 1000 nm, about 200 nm and about 900 nm, about 300 nm and about 800 nm, about 400 nm and about 700 nm, or about 400 nm and about 600 nm, although larger or smaller fillers are also contemplated. In some embodiments, a distribution of particle sizes can be controlled to impart desired wavelengths of scattered radiation. For example, the fillers can be relatively uniform in size, such as where a standard deviation of particle sizes is no greater than about 50%, no greater than about 45%, no greater than about 40%, no greater than about 35%, no greater than about 30%, no greater than about 25%, or no greater than about 20% of an average particle size. In some embodiments, a number density of the fillers within the textile is at least about 0.1 µm$^{-3}$, at least about 0.5 µm$^{-3}$, at least about 1 µm$^{-3}$, at least about 2 µm$^{-3}$, at least about 4 µm$^{-3}$, or at least about 6 µm$^{-3}$, and up to about 8 µm$^{-3}$ or greater. The fillers can be regularly or irregularly shaped, and can have aspect ratios of about 3 or less, or greater than about 3.

A textile of some embodiments is porous. Pores of the textile can be sized to contribute to selective scattering of light in a desired spectrum, in conjunction with fillers. For example, the pores can be nano-sized (e.g., as nanopores) so as to be comparable to wavelengths of visible light and below wavelengths of mid-IR radiation. In some embodiments, the pores have an average or peak pore size in a range of about 10 nm to about 4000 nm, about 1000 nm to about 4000 nm, about 100 nm to about 1000 nm, about 100 nm to about 900 nm, about 100 nm to about 800 nm, about 100 nm to about 700 nm, about 100 nm to about 600 nm, about 100 nm to about 500 nm, about 100 nm to about 400 nm, about 100 nm to about 300 nm, about 500 nm and about 1000 nm, about 200 nm and about 900 nm, about 300 nm and about 800 nm, about 400 nm and about 700 nm, or about 400 nm and about 600 nm, although larger or smaller pores are also contemplated. In some embodiments, a distribution of pore sizes can be controlled to impart desired wavelengths of scattered radiation. For example, the pores can be relatively uniform in size, such as where a standard deviation of pore sizes is no greater than about 50%, no greater than about 45%, no greater than about 40%, no greater than about 35%, no greater than about 30%, no greater than about 25%, or no greater than about 20% of an average pore size. A pore size can be determined using, for example, the Barret-Joyner-Halenda model. In some embodiments, a volume percentage of the pores within the textile is at least about 1%, at least about 5%, at least about 10%, at least about 15%, or at least about 20%, and up to about 30% or more. In some embodiments, at least some of the pores can be interconnected to increase air permeability and increase conduction and convection heat dissipation through the interconnected pores. The pores can be regularly or irregularly shaped, and can have aspect ratios of about 3 or less, or greater than about 3.

Figure 1B:
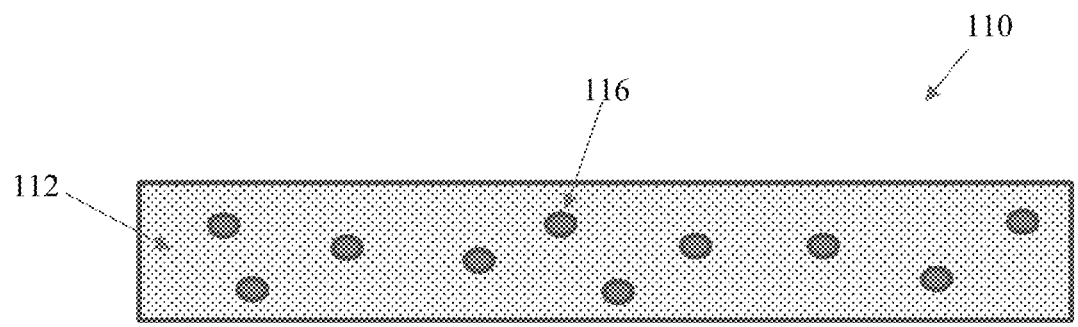
FIG. 1(b). Schematic of a non-porous film of some embodiments.
Figure 2:
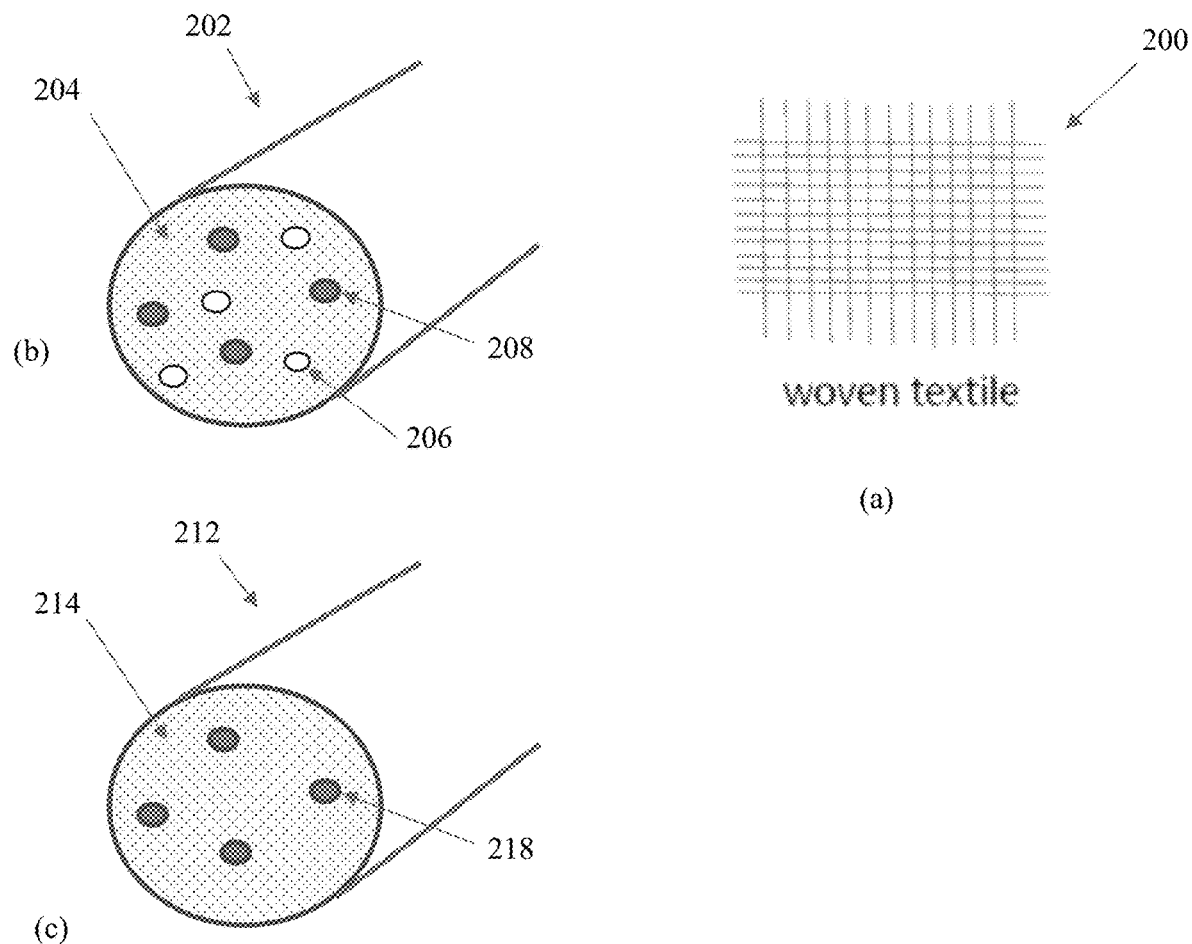
FIG. 2. Schematic of (a) a woven textile, (b) a porous polymer fiber, and (c) a non-porous polymer fiber of some embodiments.

A textile of some embodiments can be formed as a porous film 100 including a matrix 102 of a polymer or a blend of polymers having pores 104 and embedded with particulate fillers 106 (see FIG. 1(a)), or can be formed as a non-porous film 110 including a matrix 112 of a polymer or a blend of polymers and embedded with particulate fillers 116 (see FIG. 1(b)). A textile of additional embodiments can be formed as a fiber-based woven textile 200 (see FIG. 2(a)). In the case of the woven textile 200, a porous polymer fiber 202 included in the textile 200 includes an elongated member 204 having pores 206, and particulate fillers 208 dispersed within the elongated member 204. Alternatively, or in conjunction, a non-porous polymer fiber 212 included in the textile 200 includes an elongated member 214 lacking pores, and particulate fillers 218 dispersed within the elongated member 214. In general, a polymer fiber can have a circular cross-sectional shape, as well as a variety of other regular or irregular cross-sectional shapes, such as multi-lobal, octagonal, oval, pentagonal, rectangular, square-shaped, trapezoidal, triangular, wedge-shaped, and so forth. A surface of the fiber can be chemically or physically modified to impart additional properties, such as hydrophilicity, anti-microbial property, coloration, texturing, and so forth. For example, a coating can be applied over the surface of the fiber to impart hydrophilicity, such as a coating of a hydrophilic agent. In some embodiments, a polymer fiber includes multiple (e.g., two or more) elongated members that are joined or otherwise combined to form a unitary body of the fiber. At least one of the elongated members includes particulate fillers dispersed therein, and the elongated members can include the same polymer (or the same blend of polymers) or different polymers (or different blends of polymers). The elongated members can be arranged in a variety of configurations. For example, the elongated members can be arranged in a core-sheath configuration, an island-in-sea configuration, a matrix or checkerboard configuration, a segmented-pie configuration, a side-by-side configuration, a striped configuration, and so forth. Further embodiments of a polymer fiber can be realized so as to have a hollow structure, a block structure, a grafted structure, and so forth.

In some embodiments, a textile is formed by a process of extrusion and solvent extraction. In particular, a polymer or a blend of polymers can be combined with particulate fillers in a solvent, such as paraffin oil, to form a mixture. A volume percentage of the solvent in the mixture can be selected to obtain a desired volume percentage of pores within the resulting textile after solvent extraction, such as at least about 1%, at least about 5%, at least about 10%, at least about 15%, or at least about 20%, and up to about 30% or more. In place of, or in combination with, paraffin oil, other suitable liquid solvents or solids can be used, such as solid wax, mineral oil, and so forth. Also, one or more additives can be included in the mixture, such as water wicking agents, colorants, and so forth. The mixture can then be extruded through an extrusion device to form a film or a polymer fiber including the solvent dispersed therein, and the solvent is extracted to leave nanopores. Extraction of the solvent can be performed by immersion in a chemical bath of an extraction agent, such as methylene chloride, although other manners of extraction are contemplated, such as evaporation. Once formed, polymer fibers of some embodiments can be subjected to a variety of processes to form a woven textile, either as individual fibers or as included in a multi-fiber yarn. Examples include weaving, knitting, felting, braiding, plaiting, and so forth. In some embodiments, polymer fibers including different particulate fillers to yield different colors are combined or blended at a particular ratio to form a woven textile having a desired color.

A textile of some embodiments can exhibit various benefits. In some embodiments, the textile has a transmittance of IR radiation at a wavelength of 9.5 µm of at least about 30%, at least about 40%, at least about 50%, at least about 60%, at least about 70%, or at least about 80%, and up to about 90%, up to about 95%, up to about 98%, or more. In some embodiments, the textile has a weighted average transmittance of IR radiation over a wavelength range of 7-14 µm of at least about 30%, at least about 40%, at least about 50%, at least about 60%, at least about 70%, or at least about 80%, and up to about 90%, up to about 95%, or more. In some embodiments, the textile has a weighted average reflectivity of radiation over a wavelength range of 0.3-2 µm of at least about 30%, at least about 40%, at least about 50%, at least about 60%, at least about 70%, or at least about 80%, and up to about 90%, up to about 95%, up to about 98%, or more.

A textile of some embodiments can be incorporated into a cloth, either as a single layer in a single-layered cloth, or among multiple (e.g., two or more) layers of a multi-layered cloth. In the case of a multi-layered cloth, the textile can be laminated or otherwise combined with one or more additional layers, such as one or more layers of other textile materials (e.g., cotton or polyester). A resulting cloth can be used in a variety of articles of clothing, such as apparel and footwear, as well as other products, such as medical products.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Spectrally Selective Textile Using Inorganic-Organic Matrix for Passive Radiative Outdoor Personal Cooling Overview:

Here, this example demonstrates a radiative outdoor cooling textile using an inorganic-organic composite matrix. By reflecting more than about 90% of solar irradiance and selectively transmitting out human body thermal radiation, this textile can allow a skin-simulating heater with a heat generation rate (about 104 W/m$^2$) comparable to that of the human body to avoid overheating by about 5 to about 13° C. compared to a normal textile like cotton under peak daylight condition. Owing to its superior passive cooling capability and compatibility with large scale production, this radiative outdoor cooling textile is promising to widely benefit the society from many aspects.

Results and Discussion:

Outdoor space is an inevitable part in everyday life that accommodates various indispensable physical activities. For example, it has long been recognized that outdoor recreational activities are vitally important for maintaining physical health and mental wellness of individuals. Additionally, a wide range of occupations that significantly contribute to the economy of the society, such as farming, landscaping, mining, construction, transportation, and so forth, involve extensive outdoor labor work. However, one risk often encountered when performing outdoor activities is the exposure to excessive heat stress. When the heat stress is not effectively dissipated by the human body, hyperthermia will occur and cause life-threatening clinical syndromes of heat stroke, heat exhaustion and heat cramps. It is reported that heat stress is the leading cause of mortality from natural hazards in the United States. Heat-resulted physiological and psychological effects also lead to reduction in industrial labor productivity and supply, which eventually impact the overall economy and social welfare, especially in developing countries. In the context of global warming, the health and economic threats of outdoor heat stress to the daily life as well as occupational, sport and military sectors will become more intense and frequent. Recent analysis estimated that the annual cost of heat caused issues will reach about $2.4 trillion by 2030.

Outdoor cooling is therefore desired in many aspects, but remains a big challenge due to its open nature. Unlike indoor space where air conditioning can be readily implemented, it is impractical and uneconomical to cool the enormous open space in the outdoor environment using energy-intensive heating, ventilation, and air conditioning (HVAC) systems. A desired solution under these circumstances is localized cooling of the human body through garments. At present, a cooling technology used in outdoor garments involves moisture wicking, which facilitates the removal of metabolic heat by pulling sweat away from the skin to the fabric outer surface, so that sweat can evaporate into the air more readily than being trapped in between the skin and fabric. However, this technology relies upon perspiration, which involves a potential risk of dehydration that can cause physical and mental deterioration or even death. Besides, its effect is severely constrained when the humidity of the ambient air is high enough to inhibit the evaporation of perspiration. Other technologies for cooling garments include the incorporation of phase change materials and the circulation of cool air or liquid. These technologies nevertheless have several drawbacks that hinder their wide adoption in the market, such as reduced mobility and discomfort due to the inclusion of bulky packs or tubes, and high cost due to replenishment over time or power consumption.

Radiative cooling textile is recognized as an attractive strategy because it leverages the innate ability of the human body to emit thermal radiation without inclusion of any energy input. For indoor environment, it is demonstrated that infrared (IR) transparent textile can passively provide considerable personal cooling. Outdoor radiative cooling textile under direct sunlight, however, presents a remarkably greater challenge due to the substantial external heating from the solar irradiance (about 1000 W/m$^2$) and appreciable internal body heat generation (about 100 W/m$^2$).

Here, this example demonstrates an improved concept of outdoor radiative cooling textile with more than about 90% reflection of solar irradiance and high transmission of the human body thermal radiation. A combination of material property and structural photonic engineering is used to develop this textile with selective spectral response by embedding zinc oxide (ZnO) nanoparticles into nanoporous polyethylene (ZnO-PE). It is experimentally shown that ZnO-PE can allow a skin-simulating heater with a heat generation rate of about 104 W/m$^2$ comparable to that of the human skin to avoid overheating by more than about 10° C., corresponding to cooling power of more than about 200 W/m$^2$, compared to a normal textile like cotton under typical outdoor environment with peak solar irradiance over about 900 W/m$^2$. Furthermore, when sweat evaporation comes into play, the radiative cooling textile can still avoid overheating of the skin-simulating heater by up to about 8° C. compared to cotton. These results demonstrate the superior capability of selectively tailoring textile radiation property for passive outdoor cooling. This improved textile can lead to improvement of outdoor thermal comfort that engages more people to embrace the benefits of outdoors.

Figure 3:
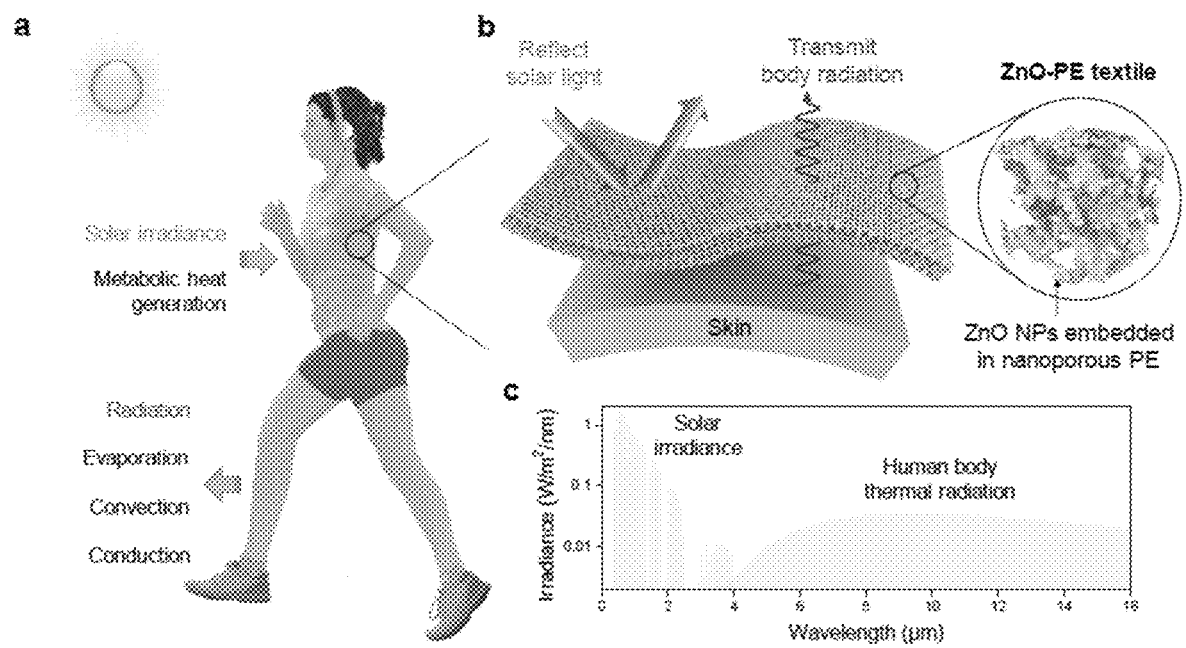
FIG. 3. (a) Schematic illustrating the heat input and output pathways of the human body under sunlight in an outdoor environment. (b) Schematic of zinc oxide (ZnO) nanoparticles embedded nanoporous polyethylene (PE) textile, designed for radiative outdoor cooling by reflecting sunlight and transmitting human body thermal radiation. (c) Spectra comparison of AM 1.5G solar irradiation and human body thermal radiation simulated using Planck's law at the skin temperature of about 34° C., showing that they have marginal overlap in the wavelength range.

The heat exchange between a human body and an outdoor environment is illustrated in FIG. 3a. The total heat stress on the human body can be specified as:

$$P_{heat\ stress} = P_{gen} + P_{sun} - P_{rad} - P_{evap} - P_{conv} - P_{cond}$$

where $P_{gen}$ is the metabolic heat generation rate, $P_{sun}$ is the heat gain rate from solar irradiance, $P_{rad}$, $P_{evap}$, $P_{conv}$ and $P_{cond}$ are the net heat loss rates through radiation, evaporation, convection and conduction, respectively.

Figure 7:
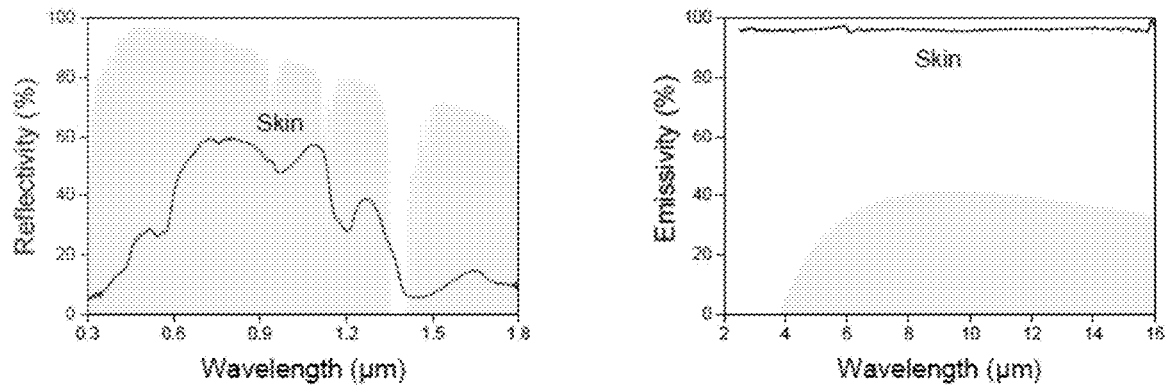
FIG. 7. Ultraviolet-visible-near infrared (UV-VIS-NIR) reflectivity and Fourier transform infrared (FTIR) emissivity of human body skin.
Figure 8:
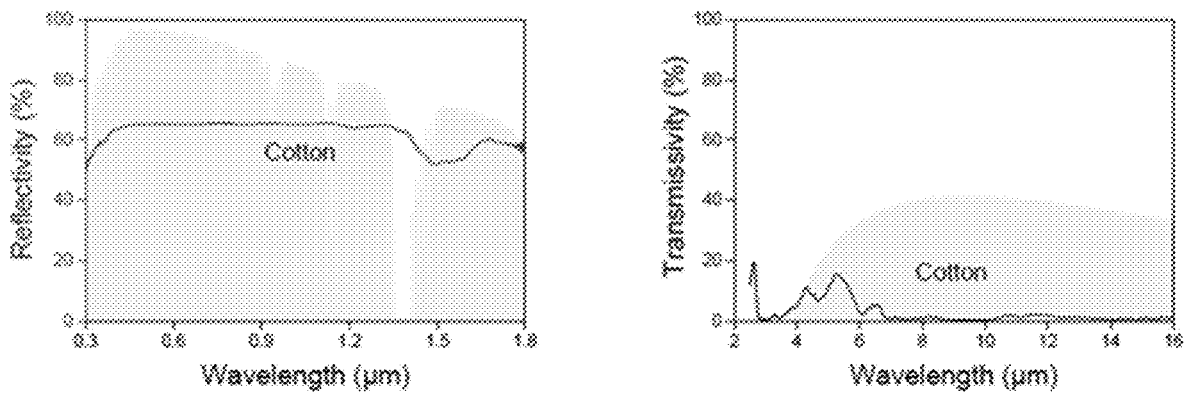
FIG. 8. UV-VIS-NIR reflectivity and FTIR transmissivity of cotton.

Maintaining outdoor thermal comfort therefore involves the reduction of heat stress by reducing heat gain and enhancing heat loss. Comparative approaches mainly focus on the evaporative and convective heat loss of garments to achieve outdoor cooling, but these two heat dissipation pathways both have their own constraints that strongly depend on the environment conditions, such as humidity and wind levels. The solar irradiance and thermal radiation terms have been less considered for a textile, despite their large contributions to the overall heat exchange. As shown in FIG. 3c, the solar irradiance spectrum (AM 1.5G) is mainly distributed in the visible and near-infrared range spanning from about 0.3 to about 4 μm with a total power density of about 1000 W/m$^2$. More than about 60% of the total solar irradiance can be absorbed by the bare skin based on its averaged solar reflectivity value (FIG. 7). On the other side, human skin is a good IR emitter with an IR emissivity of about 0.98 (FIG. 7). At the skin temperature of about 34° C., human body emits thermal radiation mainly in the mid-infrared range between about 7 to about 14 μm with the peak emission at the wavelength of about 9.5 μm and a net radiation power density of about 100 W/m$^2$. Normal textile like cotton (white) has averaged solar reflectivity of about 60%, allowing a large portion of the solar irradiance power to be absorbed by the skin (FIG. 8). In conjunction, the low IR transmissivity of cotton impedes efficient dissipation of human body thermal radiation (FIG. 8). Because of marginal overlapping between the solar irradiance and human body thermal radiation spectra (FIG. 3c), a spectrally selective radiation textile is proposed with strong solar reflection and high mid-infrared transmission to simultaneously reduce input and enhance output of radiative heat transfer for outdoor cooling.

FIG. 3b shows the schematic of the proposed outdoor radiative cooling textile, which is composed of ZnO nanoparticles (NPs) embedded within a nanoporous PE (nanoPE) matrix. Polyethylene, composed of aliphatic C—C and C—H bonds, is IR-transparent, and thus can substantially fully transmit human body radiation for indoor cooling. Its solar reflectance is not satisfactory for outdoor purpose though, due to its relatively low refractive index n of about 1.5. Inorganic solids typically have higher refractive index than polymers, among which ZnO has a high refractive index n of about 2, and also has little absorption from visible (about 400 nm) up to mid-infrared wavelengths (about 16 μm). Their material properties render the combination of ZnO and PE particularly suitable as a base material for constructing the desired radiation selectivity for outdoor cooling purpose.

Figure 4:
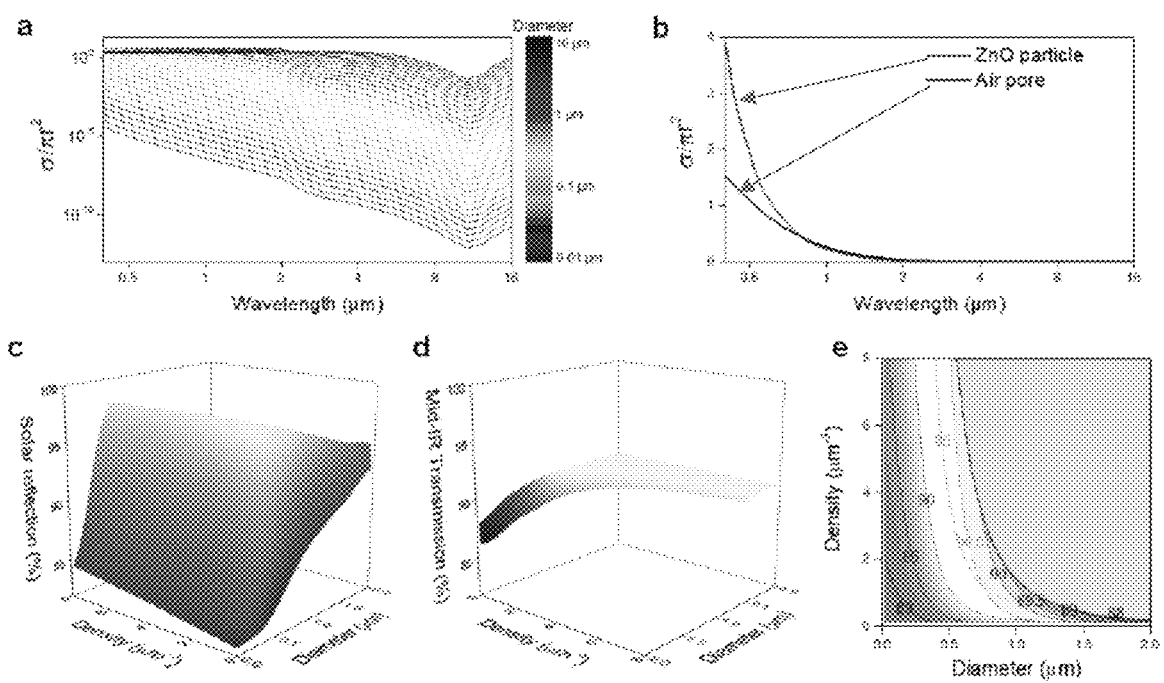
FIG. 4. (a) Simulation of normalized scattering cross-sections of a single ZnO particle in a medium of polyethylene over the wavelength range of 0.4-16 μm with the particle diameter varied from 0.01 to 10 μm. (b) Comparison of the normalized scattering cross-sections between a ZnO particle and an air pore with the same diameter of 320 nm in the medium of polyethylene. Dependence of the (c) solar reflection and (d) mid-infrared transmission of multiple ZnO particles embedded nanoporous polyethylene on the ZnO particle size and density. For each data point in (c) and (d), the scattering cross section is averaged for a normal distribution of the particle size with a variance of ±0.1 μm. The solar reflection is averaged over the solar irradiance spectrum from 0.4 to 4 μm. The mid-infrared transmission is averaged over the human body thermal radiation wavelength range from 4 to 16 μm. (e) Projection of the three-dimension plots in (c) and (d) on the density versus size plane. The white regime presents the optimal densities and sizes of ZnO particles where both high solar reflection and high mid-infrared transmission can be achieved.

Numerical optimization is performed for the inorganic-organic matrix design using structural photonic engineering to derive the spectrally selective radiation property. FIG. 4a simulates the normalized scattering cross-sections of a spherical ZnO particle in a medium of PE over the spectral wavelengths from 0.4 to 16 μm with varying particle diameters from 0.01 to 10 μm. At particle sizes below 0.1 μm or above 1 μm, the scattering cross-sections are either all small or all large over the entire wavelength range, resulting in low selectivity over the spectrum. At particle sizes between 0.1 and 1 μm, which are comparable to the wavelengths of solar light, strong Mie scattering occurs that significantly increases the scattering cross-sections selectively in the visible and near-IR ranges, while the scattering in mid-IR remains small. This result indicates that proper selection of ZnO particle size within about 0.1 to about 1 μm allows achieving high reflection in visible and near-IR and high transmission in mid-IR. In addition, the scattering cross-sections of a ZnO particle and an air pore are compared in the PE medium at the same diameter (e.g., 320 nm, FIG. 4b). The comparison shows that the ZnO particle induces stronger scattering in the visible range than the air pore, further illustrating the advantage of ZnO for attaining higher visible reflectance. Finally, detailed calculation is performed to determine the effects of ZnO particle size and density on the solar reflection (FIG. 4c) and mid-IR transmission (FIG. 4d). With the increase of particle size and density, the solar reflection increases while the mid-IR transmission decreases, leading to an optimized range (white region) projected in FIG. 4e.

Figure 5:
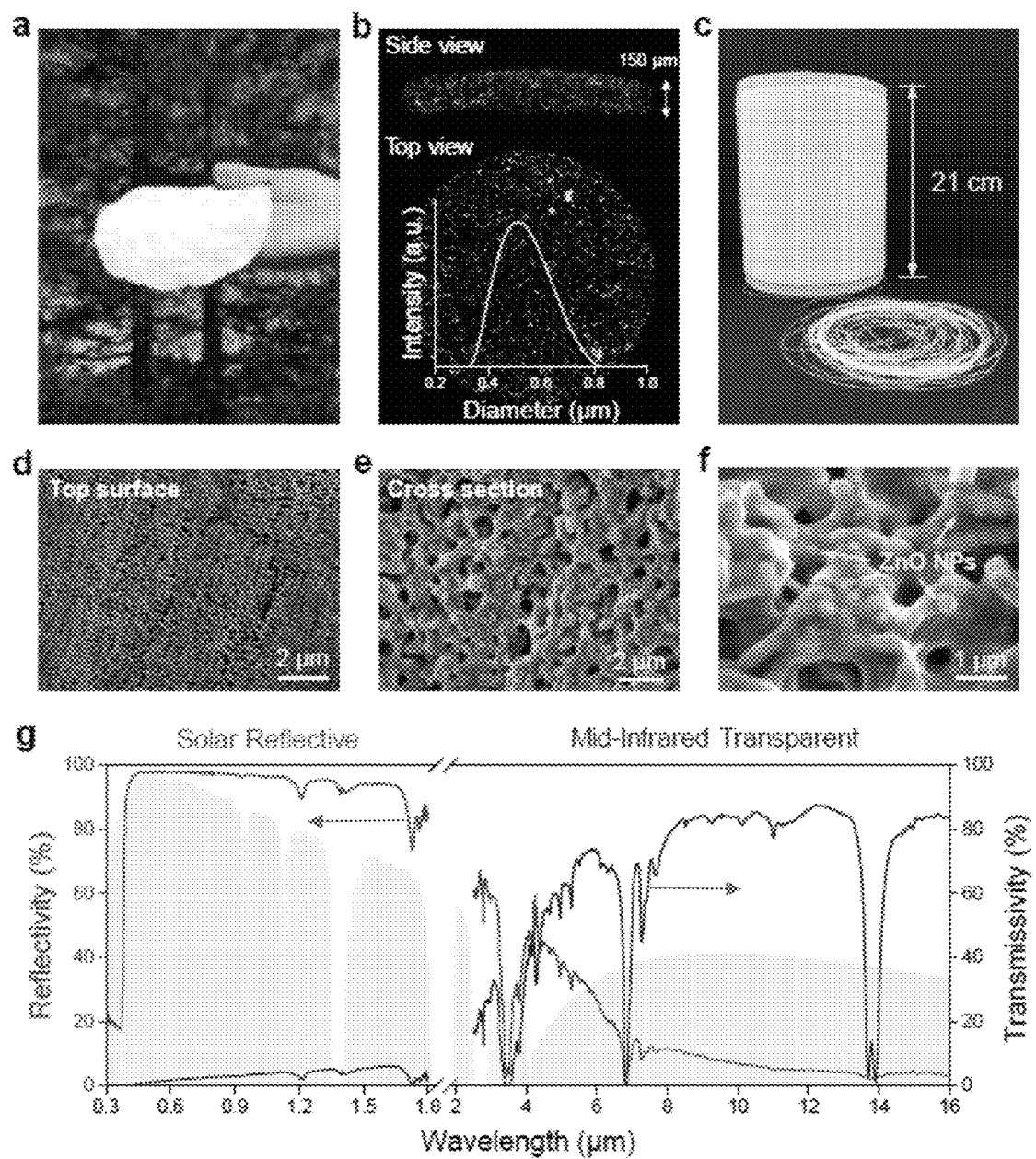
FIG. 5. (a) Image of a ZnO-PE textile under sunlight. (b) Side view and top view of an X-ray computed tomographic image for the ZnO-PE sample, showing substantially uniform distribution of ZnO particles. Inset is the distribution profile of ZnO particle diameters measured using dynamic light scattering, which peaks at about 500 nm. (c) Image of a roll of ZnO-PE fibers made by melt-extrusion. Scanning electron microscopy (SEM) images showing (d) a top surface and (e) a cross section of the ZnO-PE film sample. (f) High-magnification SEM image showing the morphology of individual ZnO particles. (g) Reflectivity and transmissivity spectra of ZnO-PE from ultraviolet to mid-infrared range (about 0.3 to about 16 μm) measured with integrating spheres. The shaded areas show the AM 1.5G solar spectrum (left) and human body radiation spectrum (right) for reference.

Given the guidance from numerical optimization, the ZnO-PE textile is experimentally fabricated by mixing ZnO particles with melted polyethylene at a weight ratio of ZnO:PE=about 2:5 in paraffin oil (ratio of PE to oil is about 1 to 5), then melt-pressing the composite mixture into a thin film, and finally extracting out the paraffin oil from the film with methylene chloride. The resulting ZnO-PE film shows a white color under the sun (FIG. 5a), indicating strong scattering of all visible light from all angles. Examination under scanning electron microscopy (SEM) revealed the porous structure of the textile (a pore occupation volume is about 20 to about 30%) with ZnO particles randomly embedded in the PE matrix (FIG. 5d-f). X-ray computed tomography scanning of the textile sample using X-ray microscope showed substantially uniform distribution of ZnO particles within the whole volume (FIG. 5b). Their diameters were characterized using dynamic light scattering to be mainly between about 0.3 and about 0.8 µm with a peak at about 0.5 µm (FIG. 5b), matching with the numerically optimized particle size.

Figure 9:
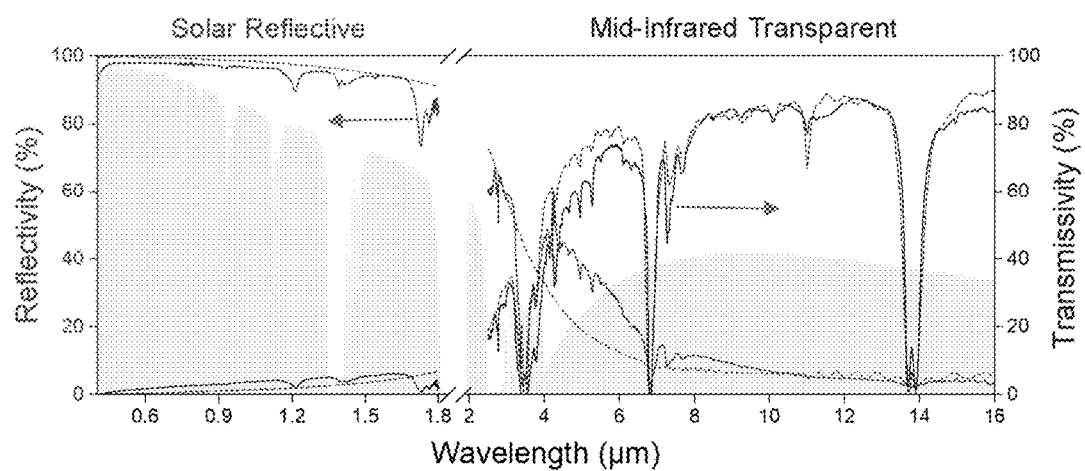
FIG. 9. Comparison of measured (solid line) and simulated (dashed line) reflectivity and transmissivity spectra of ZnO-PE from ultraviolet to mid-infrared range (0.3-16 μm). The following parameters are assumed for simulation to closely match with the experimental values: average air pore diameter of 200 nm with porosity of 20%, ZnO:PE mass ratio of 2:5, normal distribution of ZnO particle diameters as d=0.5 μm±0.1 μm, and film thickness of 150 μm. The shaded areas show the AM 1.5G solar spectrum (left) and human body radiation spectrum (right) for reference.

The optical properties of ZnO-PE were measured using ultraviolet-visible-near infrared (UV-VIS-NIR) and Fourier transform infrared (FTIR) spectroscopies with integrating spheres. The measured spectra show high reflectivity of more than about 90% in the solar light region and high transmissivity of about 80% between about 7 to about 14 µm where the human body thermal radiation is centralized (FIG. 5g). The measured spectra match well with the theoretical simulation results (FIG. 9), validating the strategic selection of proper materials and rational structural photonic design for the realization of such spectrally selective feature to satisfy the criteria of a radiative outdoor cooling textile.

Here with the aim of achieving outdoor human body cooling, the textile used, by itself, has a very low thermal emission (a high thermal transmission instead) and strong solar reflection. Its radiation property is quite different from other approaches for radiative cooling, and the approach here further highlights the diverse opportunities of radiative cooling depending on the nature of the applications. More importantly, the approach is specifically designed for textile applications with a distinctive feature that the material can be extruded into fibers for knitting or weaving of textiles (FIG. 5c).

Figure 6:
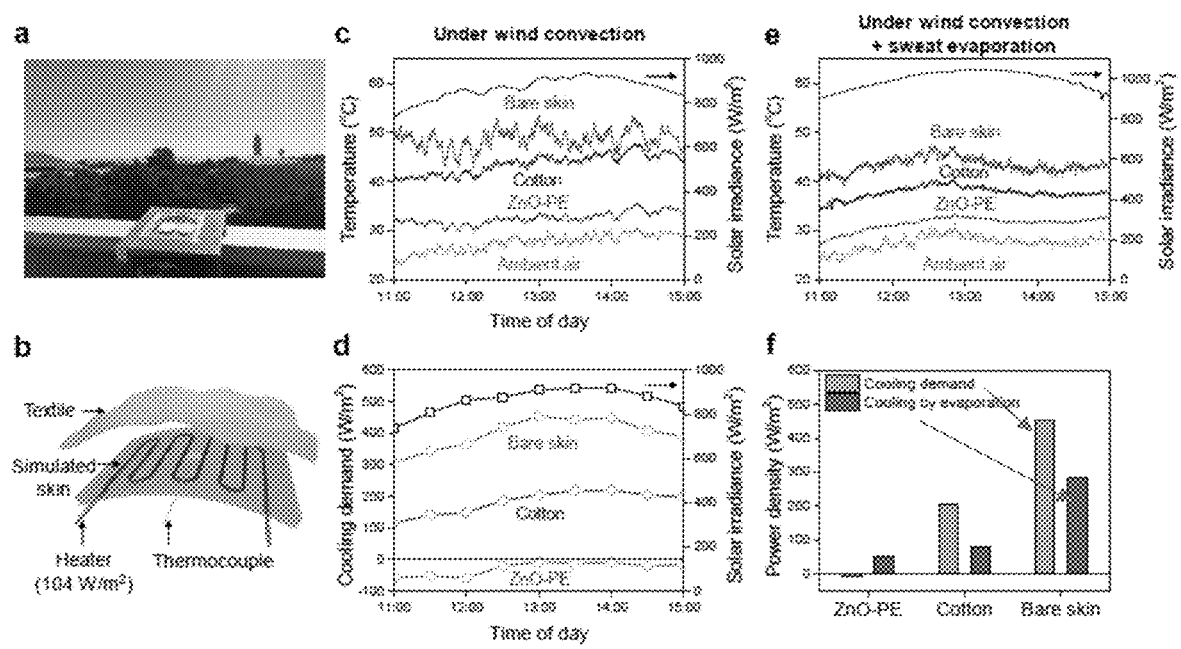
FIG. 6. (a) Image of a thermal measurement setup in an outdoor test environment. (b) Schematic of the thermal measurement setup including a heater simulating the skin, a thermocouple measuring the simulated skin temperature and a textile sample covering the simulated skin. (c) Comparison of the temperatures measured with ZnO-PE covered, cotton covered and bare skin-simulated heaters under wind convection over a duration of about four hours on a clear spring day in Stanford, California. Ambient temperature and solar irradiance are both measured and plotted for reference. (d) Calculated additional cooling power demands by ZnO-PE covered, cotton covered and bare skin-simulated heaters to maintain the normal skin temperature of about 34° C. based on the measurement results in (c). (e) Comparison of the temperatures measured with ZnO-PE covered, cotton covered and bare skin-simulating heaters under wind convection and sweat evaporation. (f) Comparison of the cooling power demands at 13:00 in (d) and the cooling power supplied by sweat evaporation, estimated as the product of the water evaporation rate through the textile (FIG. 12) and the heat of vaporization of water, for ZnO-PE covered, cotton covered and bare skin-simulating heaters.
Figure 10:
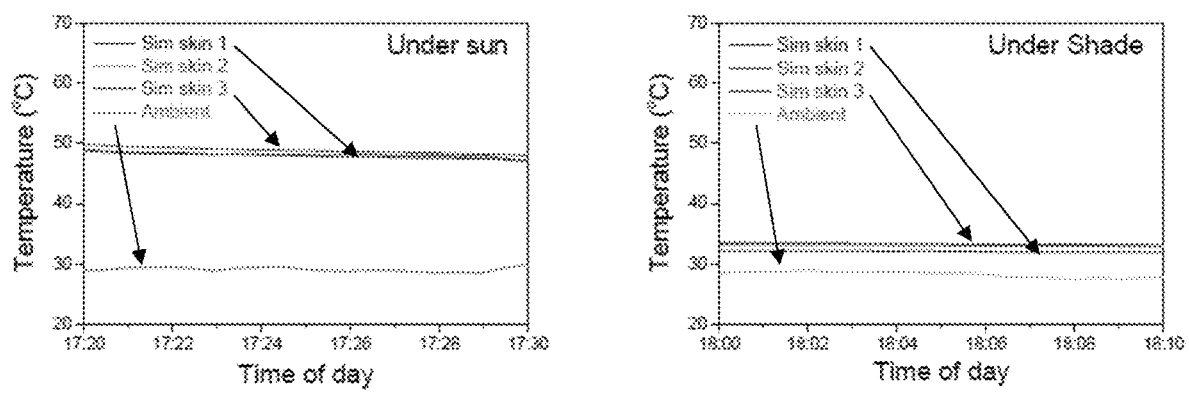
FIG. 10. Measured skin temperatures of simulated skin heaters without being covered by textiles under sun and shade.

Demonstration is made of the outdoor performance of the ZnO-PE radiative cooling textile on clear spring days in Stanford, California. The measurement setup shown in FIG. 6a includes a heater simulating the skin, which is placed on top of a foam to prevent heat loss to the bottom, a thermocouple on the heater surface to measure the simulated skin temperature, and a textile sample covering the simulated skin (FIG. 6b). A heating power input of about 104 W/m$^2$ was applied to the heater to simulate the metabolic heat generation rate of the skin. The real-time temperature of skin-simulating heater was recorded for about four hours around noon time, while the whole setup was under direct sunlight and exposed to the air. As shown in FIG. 6c, under wind convection and peak solar irradiance of about 910 W/m$^2$ around 13:00 (local time), the ZnO-PE covered skin-simulating heater displayed a temperature of about 33.5° C., much lower than that of white cotton covered (45.6° C.) and bare (53.1° C.) skin-simulating heaters. Note that the temperatures of these skin-simulating heaters without the textile samples were the same under both sunlight and shade (FIG. 10), confirming that the measured temperature differences came from the effect of the textiles. The notably lower temperature for ZnO-PE covered skin-simulating heater demonstrates the superior cooling power of ZnO-PE, ascribed to its high solar reflection that reduces heat input from sun as well as its high transmission to human body thermal radiation that enhanced radiative heat output. Calculation is performed of the additional cooling power demands by these textile samples to achieve normal skin temperature of about 34° C. under the test condition in FIG. 6c using heat transfer model analysis (Supplementary Note, FIGS. 11 and 12). Over the day from 11:00 to 15:00 (local time), cotton covered and bare skin-simulating heaters specified additional cooling powers of about 116 to about 219 W/m$^2$ and about 305 to about 454 W/m$^2$, respectively, while ZnO-PE instead passively cooled the skin-simulating heaters to maintain temperature slightly below about 34° C. without additional cooling power supply (FIG. 6d).

Figure 13:
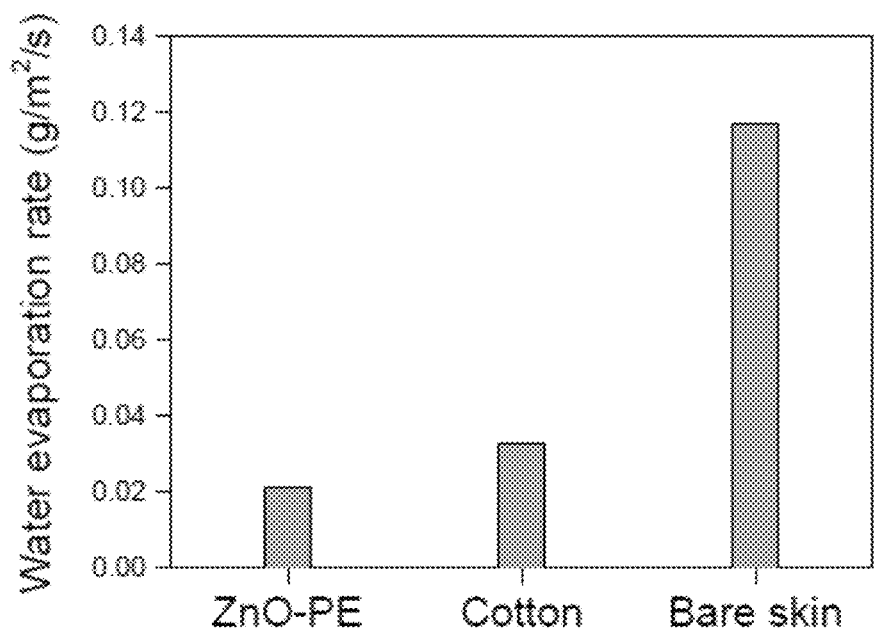
FIG. 13. Water evaporation rates from ZnO-PE covered skin, cotton covered skin and bare skin.

Further consideration is made that sweat evaporation could provide the additional cooling power, which was estimated as a product of the water evaporation rate through the textile (FIG. 13) and the heat of vaporization of water (about 44 kJ/mol). However, the estimated cooling power supply by evaporation still cannot compensate the cooling power demands by cotton covered and bare skin-simulating heaters under wind convection and peak solar irradiance of about 910 W/m$^2$ (FIG. 6f). Real-time outdoor measurement is performed under wind convection and solar irradiance of about 900 to about 1050 W/m$^2$ with a water-soaked porous layer on top of the heater to take the sweat evaporation effect into account (FIG. 6e). With the addition of sweat evaporation effect, ZnO-PE still maintains the temperature of skin-simulating heater at about 34° C., while overheating by about 5 to about 8° C. and about 9 to about 15° C. were observed for cotton covered and bare cases, respectively, which is consistent with the thermal analysis results, and further confirms the superiority of radiative cooling in outdoor environment.

Figure 14:
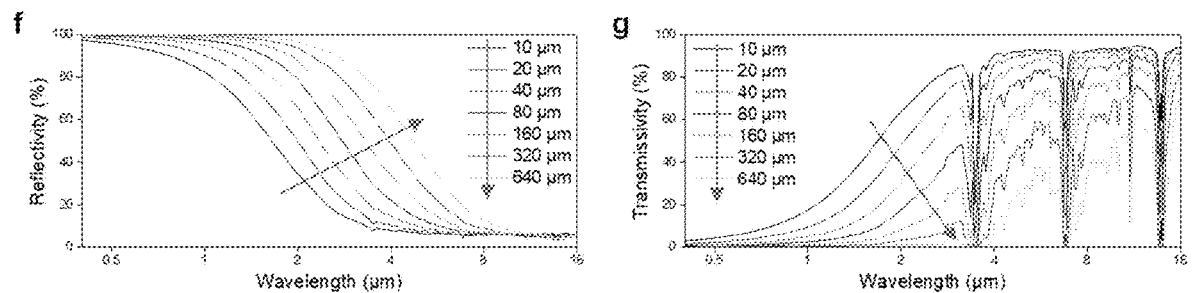
FIG. 14. Effect of ZnO-PE layer thickness on the (a) solar reflection and (b) mid-infrared transmission. A tradeoff is observed with the increase of nanocomposite layer thickness, where a thickness from about 80 μm to about 160 μm is optimal for simultaneously high solar reflection and mid-infrared transmission.

Additional consideration is made to the effect of ZnO-PE layer thickness on the solar reflection and mid-infrared transmission (FIG. 14). A tradeoff is observed with the increase of nanocomposite layer thickness within a range of about 10 µm to about 640 µm, where a thickness from about 80 µm to about 160 µm is optimal for simultaneously high solar reflection and mid-infrared transmission.

Figure 15:
FIG. 15. Inductively coupled plasma mass spectrometry (ICP-MS) measurement to quantify $Zn^{2+}$ concentration in the water before and after washing the ZnO-PE textile material with detergent and stirring force for about 30 min. The result shows that trace amount of ZnO (about 2 parts per billion (ppb)) was released into the water during the washing cycle. This demonstrates the good durability of the embedded structure, due to intimate wrapping of PE over ZnO particles.
Figure 16:
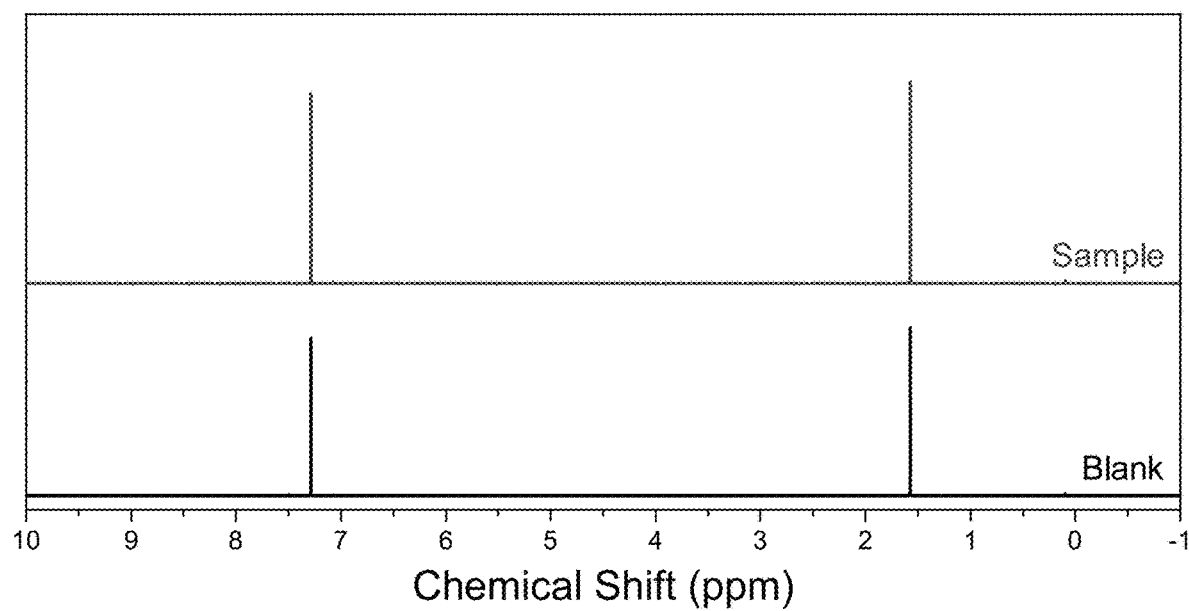
FIG. 16. $^1H$ nuclear magnetic resonance (NMR) spectrum of a textile sample dissolved in chloroform-d (top) to detect residual methylene chloride on the sample. The bottom curve is from chloroform-d (solvent for $^1H$ NMR measurement) as a blank reference. The peak at about 7.26 ppm corresponds to chloroform-d. The water peak at about 1.56 ppm is due to the trace amount of moisture absorbed from the atmosphere. The peak position for methylene chloride should be at about 5.3 ppm, which is absent in the sample curve. These measurement results confirm that methylene chloride is very volatile and can be substantially completely removed by evaporation. No residual methylene chloride was detected from the textile sample after about 2 hours drying in air.

Furthermore, the stability and durability of the ZnO-PE textile material was evaluated by measuring the Zn ion concentrations in the water before and after washing using inductively coupled plasma mass spectrometry (FIG. 15). The result shows that trace amount of ZnO (about 2 parts per billion (ppb)) was released into the water during the washing cycle. This demonstrates the good durability of the embedded structure, due to intimate wrapping of PE over ZnO particles. Also, measurement results using $^1$H nuclear magnetic resonance (NMR) confirm that methylene chloride is very volatile and can be substantially completely removed by evaporation (FIG. 16).

Figure 17:
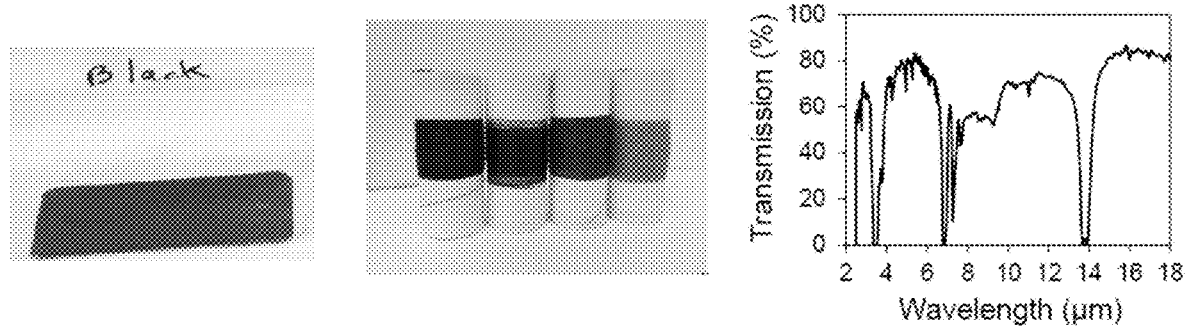
FIG. 17. Black color is implemented by adding micron-sized silicon particles to polyethylene, which also show high infrared-transparency in the wavelength range of about 4 to about 18 μm. (a) A black color Si-PE composite film is shown. (b) Black Si-PE fibers are shown together with other colored polyethylene fibers. (c) Infrared transmission spectrum of Si-PE composite film.

Furthermore, black color is implemented by adding micron-sized silicon particles to PE, which also show high infrared-transparency in the wavelength range of about 4 to about 18 µm (FIG. 17).

In summary, this example has presented the ZnO-PE textile with spectrally selective radiation properties favorable for passive outdoor cooling of the human body through the combination of material properties and structural photonic engineering. The remarkable outdoor cooling performance under peak daylight conditions demonstrated here displays the prominence of passive radiative heat dissipation mechanism, a missing feature in normal textiles, for confronting the enormous challenge of increasingly intense and frequent outdoor heat stress with warming climates. A further advantage of ZnO-PE includes its practical compatibility with large-scale fabrication. Like other synthetic textile materials (e.g., nylon and polyester), wearability modification treatments can be applied to ZnO-PE to improve the wearing comfort for practical use. Further engineering the fiber geometry of ZnO-PE to incorporate the moisture wicking property can allow cooperative function of both radiative and evaporative heat dissipation.

Materials and Methods:

Fabrication of ZnO-PE Radiative Outdoor Cooling Textile

The ZnO-PE composite material was fabricated by mixing ZnO particles (about 99.9%, Sigma Aldrich) with high density polyethylene (HDPE, melt index of about 2.2 g/10 min, Sigma Aldrich) and ultra-high molecular weight polyethylene (UHMW, Alfa Aesar) at a weight ratio of ZnO:HDPE:UHMWPE=about 2:4:1 in paraffin oil (light, Fisher Chemical) at a temperature of about 200° C. The volume of paraffin oil was about 5 times the weight of polyethylene. The mixture was then melt-pressed into a thin film at about 70 to about 100° C. Finally, the paraffin oil was extracted from the film using methylene chloride (about 99.99%, Fisher Chemical). The ZnO-PE fibers were melt-extruded using a commercial extruder.

Material Characterizations

The SEM images were taken by FEI Sirion (5 kV). The X-ray computed tomographic scanning was performed using ZEISS Xradia 520 Versa X-ray microscope. The ZnO particle diameter distribution profile was characterized using Malvern Zetasizer Nano ZS. The UV-VIS-NIR reflectivity and transmissivity were measured using Agilent Cary 6000i UV-VIS-NIR spectrophotometer with a diffuse integrating sphere. The IR reflectivity and transmissivity were measured using a FTIR spectrometer (Model 6700, Thermo Scientific) accompanied with a diffuse gold integrating sphere (PIKE Technologies).

Outdoor Thermal Measurements

The skin was simulated using a silicone rubber insulated flexible heater (Omega, about 39 cm$^2$). The heater was connected to a power supply (Keithley 2400) which provided a heating power density of about 104 W/m$^2$ to simulate the metabolic heat generation rate. An insulating foam was placed below the simulated skin heater to ensure that the heat generated by the skin heater selectively transfers to the ambient environment. A ribbon type hot junction thermocouple (about 0.3 mm in diameter, K-type, Omega) was in contact with the top surface of the heater to measure the simulated skin temperature. The textile sample covered over the skin-simulating heater. The whole device was supported by a wood frame covered with a layer of aluminized Mylar. During testing, the setup was exposed to direct sunlight and air. Measurement is made of the real-time temperatures for skin-simulating heaters covered by ZnO-PE and cotton and uncovered, as well as the ambient temperature. Direct and diffuse solar irradiance was recorded using a pyranometer (Kipp&Zonen CMP 6). For measurements with the sweat evaporation effect, a thin layer of carbon-coated aluminum foam was soaked with water, sealed with a polydopamine-coated nanoPE film, and placed on top of the heater to simulate the sweat evaporation effect.

Water Evaporation Rate Test

This test procedure is based on ASTM E96 with modification. About 100 mL media bottles (Fisher Scientific) were filled with about 40 mL distilled water and then sealed by the textile samples using open-top caps and silicone gaskets (Corning). The sealed bottles were then placed into an environmental chamber. The temperature and relative humidity inside the chamber were held at about 35° C. and 30±10%, respectively. The total mass of the bottles together with the samples was measured periodically. The reduced mass, corresponding to the evaporated water, was then divided by the exposed area (about 3 cm in diameter) and the time to derive the water evaporation rate.

Modelling of Transmission and Reflection from ZnO Embedded Polyethylene

To simulate the optical transmission and reflection, the ZnO embedded PE material is modeled as a random medium containing uniformly distributed scattering particles. The optical scattering characteristics of a single ZnO nanoparticle can be calculated using the Mie theory. The optical parameters of ZnO used for the calculation can be found in W. L. Bond, "Measurement of the Refractive Indices of Several Crystals," *Journal of Applied Physics* 36, 1674 (1965), and M. R. Querry, "Optical constants" (MISSOURI UNIV-KANSAS CITY, 1985). The scattering cross sections of particles with different sizes at different wavelengths are computed. For simulating multiple ZnO nanoparticles embedded PE, the scattering cross section is averaged for a normal distribution of the ZnO particle size with a variance of ±0.1 µm.

The optical transmission through such random medium can be simulated using the Chandrasekhar radiative transfer theory. The ZnO nano-particles are modeled as isotropic scatters, which is a good approximation given that each ZnO particle can have a different shape, but a macroscopic averaged optical property affects the performance of the textile. The transmission through a slab region that contains scattering particles can be obtained as:

$$T_{sca} = \frac{1}{1 + \frac{3}{4}\rho\sigma_{avg}h} \tag{1}$$

where $\rho$ is the density of the ZnO nanoparticle, $\sigma_{avg}$ is the average scattering cross section, and h is the thickness of the material.

Eq. (1) applies to the situation where the slab region in an infinite host medium is embedded with the scattering particles. Considering that the ZnO embedded PE is a film structure suspended in air, the overall transmission $T_{overall}$ is therefore calculated by multiplying the transmission $T_f$ of the film structure as an effective medium separately with the transmission obtained in Eq. (1), namely:

$$T_{overall} = T_f T_{sca} \tag{2}$$

As the material absorption is negligibly small in the interested wavelength range, the overall reflection of the ZnO embedded PE film is calculated as $R_{overall} = 1 - T_{overall}$.

Supplementary Note:

Heat Transfer Model Analysis of Additional Cooling Power Demand

Figure 11:
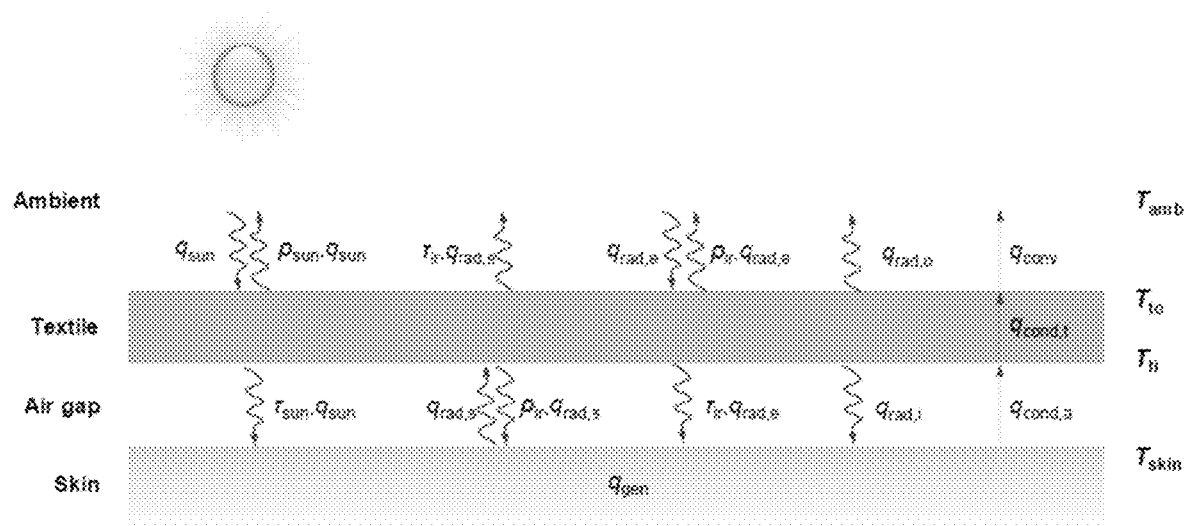
FIG. 11. Schematic of a heat transfer model of a clothed human body under sunlight.

A one-dimensional steady-state heat transfer model analysis is used to determine the additional cooling power demand by the skin to achieve the skin temperature of 34° C. at outdoor conditions (FIG. 11). In this model, the heat gain of human body is from solar irradiance and metabolic heat generation. Heat radiation, conduction and convection are included to simulate the heat dissipation from a clothed human body to the ambient air (FIG. 7).

For textile covered skin, the energy balance equations at the skin surface and textile outer surface can be expressed as:

At the skin surface:

$$q_{gen} - q_{cool} = -\frac{\tau_{textile,vis} \cdot (1 - \rho_{skin,vis})}{1 - \rho_{textile,vis} \cdot \rho_{skin,vis}} \cdot q_{sun} + \quad (3)$$
$$(1 - \rho_{textile,ir}) \cdot q_{rad,skin} - \tau_{textile,ir} \cdot q_{rad,amb} - q_{rad,ti} + q_{cond,air}$$

At the textile outer surface:

$$q_{gen} - q_{cool} = -\left[(1 - \rho_{textile,vis}) - \frac{\tau_{textile,vis}^2 \cdot \rho_{skin,vis}}{1 - \rho_{textile,vis} \cdot \rho_{skin,vis}}\right] \cdot q_{sun} + \quad (4)$$
$$\tau_{textile,ir} \cdot q_{rad,skin} - (1 - \rho_{textile,ir}) \cdot q_{rad,amb} + q_{rad,to} + q_{conv}$$

The temperature profile within the textile can be approximated as:

$$T_{to} = \frac{t_{textile}}{2k_{textile}}\left\{\varepsilon_{textile,ir}\sigma T_{ti}^4 + \right.$$
$$\varepsilon_{textile,ir}\sigma T_{to}^4 - \alpha_{textile,ir}\sigma T_{skin}^4 - \alpha_{textile,ir}\sigma T_{amb}^4 -$$
$$\left[(1 - \rho_{textile,vis}) - \frac{\tau_{textile,vis}^2 \cdot \rho_{skin,vis} + \tau_{textile,vis} \cdot (1 - \rho_{skin,vis})}{1 - \rho_{textile,vis} \cdot \rho_{skin,vis}}\right] \cdot q_{sun}\right\} -$$
$$\frac{k_{air}t_{textile}}{k_{textile}t_{air}} \cdot (T_{skin} - T_{ti}) + T_{ti} \quad (5)$$

For bare skin, the energy balance equation at the skin surface is:

$$q_{gen} - q_{cool} = -(1 - \rho_{skin,vis}) \cdot q_{sun} + q_{rad,skin} - q_{rad,amb} + q_{conv} \quad (6)$$

Here, $q_{gen}$ is the metabolic heat generation rate per unit area, $q_{cool}$ is the additional cooling power supply. $q_{rad,skin}$ is the radiative heat flux from the skin, $q_{rad,amb}$ is the radiative heat flux from the ambient air, $q_{rad,ti}$ is the radiative heat flux from the textile inner surface, $q_{rad,to}$ is the radiative heat flux from the textile outer surface, $q_{cond,air}$ is the conductive heat flux in the air gap between the skin and the textile, and $q_{conv}$ is the convective heat flux from the textile to the ambient air. Based on Fourier's law, Newton's law of cooling and Stefan-Boltzmann law, the conductive, convective and radiative heat flux terms can be expressed as:

$$q_{rad,skin} = \sigma T_{skin}^4 \quad (7)$$

$$q_{rad,amb} = \varepsilon_{amb}\sigma T_{amb}^4 \quad (8)$$

$$q_{rad,ti} = \varepsilon_{textile,ir}\sigma T_{ti}^4 \quad (9)$$

$$q_{rad,to} = \varepsilon_{textile,ir}\sigma T_{to}^4 \quad (10)$$

$$q_{cond,air} = k_{air} \cdot \frac{T_{skin} - T_{ti}}{t_{air}} \quad (11)$$

$$q_{conv} = h \cdot (T_{to} - T_{amb}) \quad (12)$$

All the input parameters are listed in Table 1 below.

TABLE 1

Input parameters for heat transfer model analysis.

| Symbol | Definition | Value | Unit |
|---|---|---|---|
| $q_{gen}$ | Metabolic heat generation flux | 104 | $W \cdot m^{-2}$ |
| k | Thermal conductivity | Textile, $k_{textile}$ = 0.05<br>Air gap, $k_{air}$ = 0.03 | $W \cdot m^{-1} \cdot K^{-1}$ |
| t | Thickness | Cotton, $t_{cotton}$ ~ 180<br>ZnO-PE, $t_{ZnO-PE}$ = 150<br>Air gap, $t_{air}$ = 300~500 | μm |
| σ | Stefan-Boltzmann constant | $5.67 \times 10^{-8}$ | $W \cdot m^{-2} \cdot K^{-4}$ |
| $\varepsilon_{ir}$ | MIR emittance | Skin, $\varepsilon_{skin}$ = 1<br>Ambient, $\varepsilon_{amb}$ = 0.8<br>Cotton, $\varepsilon_{cotton, ir}$ = 0.88<br>ZnO-PE, $\varepsilon_{ZnO-PE, ir}$ = 0.15 | unitless |
| $\alpha_{ir}$ | MIR absorbance | Cotton, $\alpha_{cotton, ir}$ = 0.88<br>ZnO-PE, $\alpha_{ZnO-PE, ir}$ = 0.15 | unitless |
| $\tau_{ir}$ | MIR transmittance | Cotton, $\tau_{cotton, ir}$ = 0.03<br>ZnO-PE, $\tau_{ZnO-PE, ir}$ = 0.7 | unitless |
| $\rho_{ir}$ | MIR reflectance | Cotton, $\rho_{cotton, ir}$ = 0.09<br>ZnO-PE, $\rho_{ZnO-PE, ir}$ = 0.15 | unitless |
| $\alpha_{vis}$ | UV-VIS-NIR absorbance | Cotton, $\alpha_{cotton, vis}$ = 0.03<br>ZnO-PE, $\alpha_{ZnO-PE, vis}$ = 0.08 | unitless |
| $\tau_{vis}$ | UV-VIS-NIR transmittance | Cotton, $\tau_{cotton, vis}$ = 0.33<br>ZnO-PE, $\tau_{ZnO-PE, vis}$ = 0.02 | unitless |
| $\rho_{vis}$ | UV-VIS-NIR reflectance | Skin, $\rho_{skin, vis}$ = 0.36<br>Cotton, $\rho_{cotton, vis}$ = 0.64<br>ZnO-PE, $\rho_{ZnO-PE, vis}$ = 0.9 | unitless |

Figure 12:
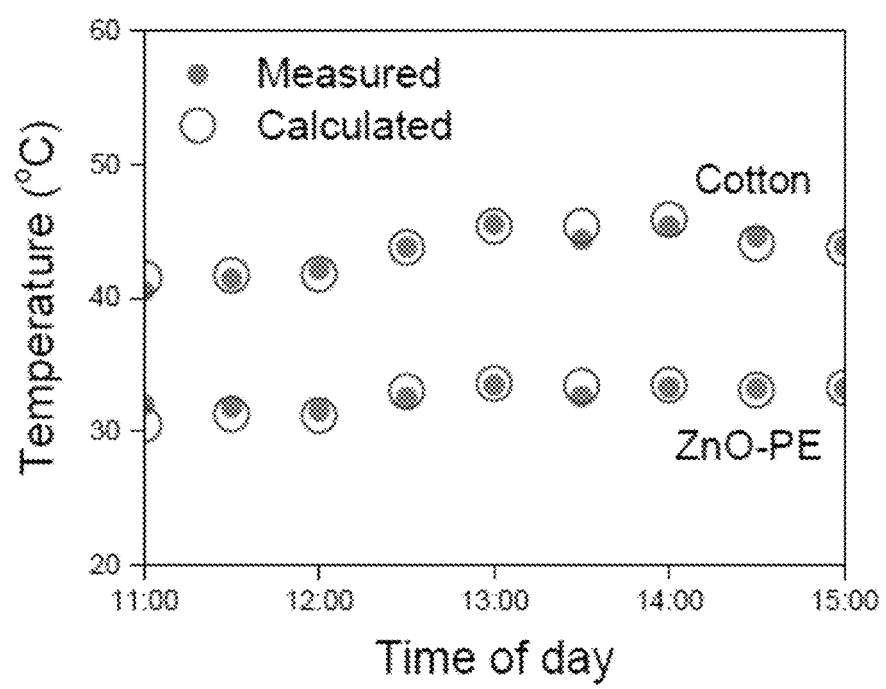
FIG. 12. Comparison of calculated skin temperatures from heat transfer model analysis with measured values for cotton and ZnO-PE covered skin.

During outdoor thermal test, no additional cooling power is supplied, namely $q_{cool}$=0. Using the measured $P_{sun}$, $T_{skin}$ and $T_{amb}$ values in FIG. 6c, the convective heat transfer coefficients h at different times are fitted over the test period using equation (6) for the bare skin case. Using the fitted convective heat transfer coefficients h values, calculation is performed of the skin temperatures for ZnO-PE and cotton cases, which match well with the measured skin temperature values (FIG. 12). This results confirm the applicability of the heat transfer model analysis. Calculation is performed of the additional cooling power $q_{cool}$ to maintain the skin temperature of 34° C. at the test conditions in FIG. 6c by plugging in $T_{skin}$=34° C. and all the other given input parameters into equations (3), (4), (5) and (6).

Example 2

Coloration of Infrared-Transparent Polyethylene Textiles for Passive Radiative Cooling Overview:

Effectively regulating the heat flow between human body and environment not only improves thermal comfort but also presents an improved and cost-effective approach for reducing the building energy consumption. Infrared property-engineered textiles have been shown to passively regulate the radiation heat dissipation for effective human body cooling and warming. However, it remains a major challenge to allow simultaneous control of the visible color without compromising the desired infrared property, which largely constraints their attractiveness for practical applications. Here, this example reports a strategy utilizing inorganic nanoparticles as a coloring component instead of dye molecules and polyethylene as a flexible host to fabricate visible-colored and infrared-transparent textiles via large-scale industrial processes. The as-fabricated composite textiles show high infrared transparency of about 80% with passive cooling effect of about 1.6 to about 1.8° C., and also exhibit intense visible colors with good washing stability. This facile coloration approach can promote the commercialization of radiative textiles in temperature-regulating wearable applications for effective energy savings.

Results and Discussion:

Managing the heat flow on wearables is an important function for improving human health and comfort. In addition, thermal-managing wearables can have substantial impact on energy savings in buildings, considering that enormous energy is spent on space heating and cooling, and accounting, for instance, more than about 10% of the total energy consumption in United States. This is desired for mitigating the increasing energy demand and climate change issues, as population and living standards increase. In contrast to building-level temperature regulation where most of the energy is wasted for the empty space, a personal thermal management strategy is a more efficient and cost-effective solution, which aims at providing localized heating and cooling to the human body and its local environment.

Controlling the infrared (IR) property of garment textiles can show strong effects on localized cooling and heating of the human body. For example, IR-transparent nanoporous polyethylene (nanoPE) is demonstrated to passively cool the body by about 2° C., and metallized nanoPE with low IR emissivity can warm up the body by about 7° C. This is due to the fact that the human skin has high emissivity ($\varepsilon$=about 0.98) and acts like a black body, which strongly emits thermal radiation in the IR wavelength range of about 7 to about 14 μm with a peak intensity at about 9.5 μm. Therefore, the thermal radiation path plays an indispensable role in human body heat dissipation, accounting for more than about 50% at indoor conditions. These findings open up a direction for personal thermal management, since comparative textile materials lack the capability of infrared radiation control.

However, the infrared property constraint can give rise to great difficulty in simultaneously controlling the visible color appearance. This dilemma remains a major challenge that constraints their practical application in real life, since color is one of the most important factors that govern the wearable market. The challenge lies in that organic fabric dye molecules have different kinds of chemical bonds, which can strongly absorb human body radiation, such as C—O stretching (about 7.7-about 10 μm), C—N stretching (about 8.2-about 9.8 μm), aromatic C—H bending (about 7.8-about 14.5 μm) and S=O stretching (about 9.4-about 9.8 μm). Thus, addition of organic dyes can cause low IR transparency, making them unsuitable for radiative cooling effects. Furthermore, polyethylene, the base material for radiative textiles, is chemically inert and lacks polar groups, which inhibits surface adhesion of chemical dyes.

In this example, the dilemma is solved between visible and infrared property control, and a demonstration of colored polyethylene textiles with high IR transparency for radiative cooling is reported. This is achieved by successfully identifying and utilizing inorganic pigment nanoparticles that have negligible absorption in the IR region, while reflecting certain visible colors with concentration and size optimization. Rather than the unstable surface adhesion approach, the inorganic pigment nanoparticles are compounded into the polyethylene matrix to form a substantially uniform composite for stable coloration. It is further demonstrated that the colored polyethylene composite can be readily extruded into continuous and mechanically strong fibers for knitting of interlaced fabrics using large-scale processes. The knitted fabrics show high IR transparency of about 80% and good radiative cooling performance of about 1.6 to about 1.8° C., and also good color stability against washing cycles in water. This approach lays the foundation for practical implementation of radiative textiles to provide improved personal thermal management for more efficient energy utilization.

Figure 18:
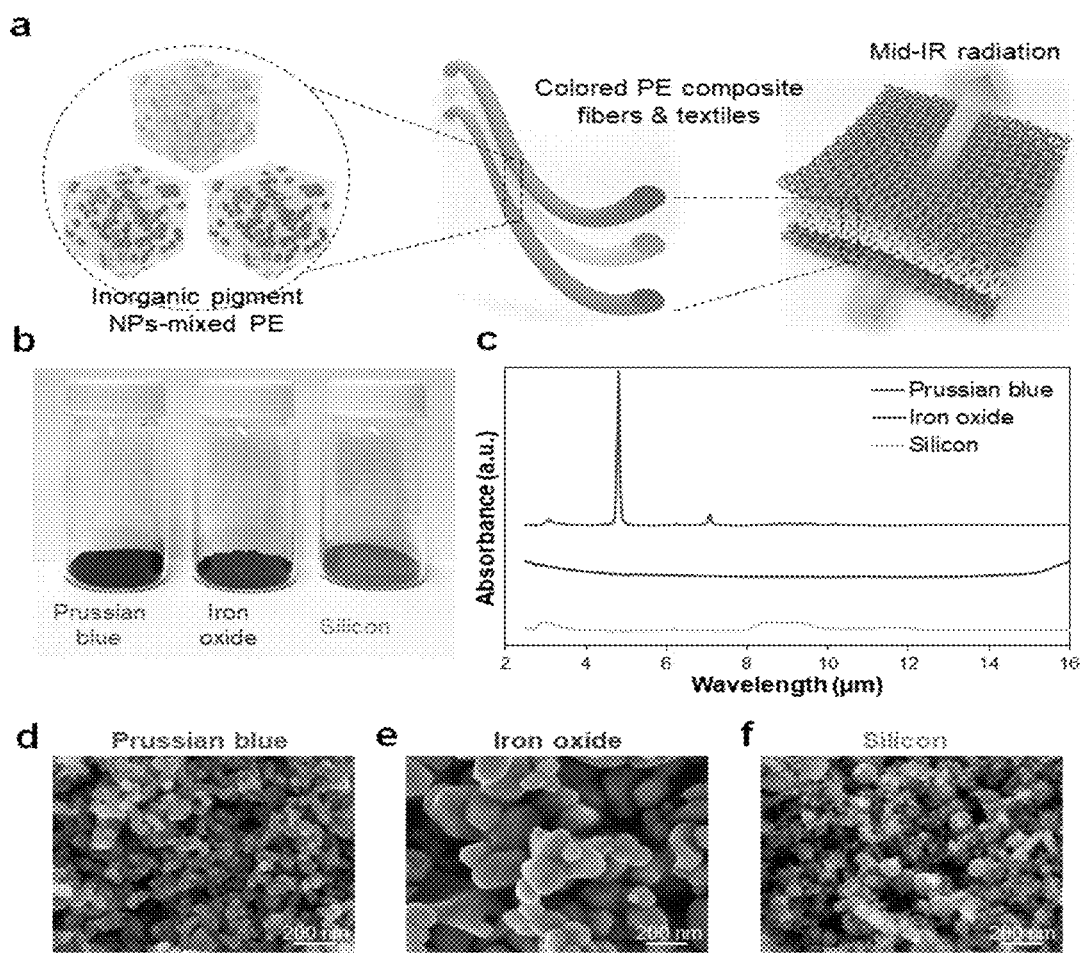
FIG. 18. (a) Schematic of a design for coloration of radiative cooling textiles, which is formed by mixing IR-transparent inorganic pigment nanoparticles with PE. The mixed composites can then be extruded into continuous fibers for knitting into interlaced textiles via large-scale industrial processes. (b) Photograph and (c) FTIR absorbance spectra of selected inorganic pigment powders. SEM images of nanoparticles for (d) Prussian blue (PB), (e) iron oxide ($Fe_2O_3$) and (f) silicon (Si).

The schematic of the proposed design for colored polyethylene textiles is shown in FIG. 18a. IR-transparent inorganic nanoparticles are selected as a pigment and polyethylene is selected as a flexible polymer host or matrix. These two components were uniformly mixed via compounding process, and the formed composites can then be extruded into fiber shape for weaving or knitting of the interlaced fabrics. The inorganic solids that were found to satisfy the criterion of IR-transparency include Prussian blue (PB), iron oxide ($Fe_2O_3$) and silicon (Si), which are also non-toxic and inexpensive for use in textiles, as shown in FIG. 18b. Fourier transform infrared (FTIR) spectroscopy measurement in FIG. 18c illustrates that these inorganic solids have negligible absorbance in the infrared wavelength region of about 4-14 μm, except an intense and narrow peak of Prussian blue at about 4.8 μm due to C≡N stretching vibration and a weak and broad peak of silicon about 8-10 μm due to the native silicon oxide on the surface. Their particle sizes were chosen in the range of about 20 nm to about 1000 nm, as revealed in the scanning electron microscopy (SEM) images in FIG. 18d-f. On one hand, this nanoscale size range is much smaller than the human body thermal radiation wavelengths of about 4-14 μm. Hence these nanoparticles will not induce strong scattering of infrared light to decrease the IR transparency of the colored polyethylene mixtures. On the other hand, high refractive index dielectric or semiconductor nanoparticles in a particular size range can have strong resonant light scattering in the visible spectral range on the basis of Mie theory. Therefore, different visible colors can be produced by controlling the nanoscale dimensions. For example, in contrast to the black color of bulk silicon, silicon nanoparticles (refractive index>about 3.8 at 633 nm) with diameters of about 100 nm to about 200 nm exhibit yellow color, which results from pronounced Mie resonance responses associated with the excitation of both magnetic and electric dipole modes. Different from silicon nanoparticles, both Prussian blue and iron oxide nanoparticles show their natural color as bulk. The intense blue color of Prussian blue is associated with the intervalence charge transfer between Fe(II) to Fe(III), while the dark red color of iron oxide is determined by its optical band gap of about 2.2 eV. With these three primary colors of blue, red and yellow, all different colors over the whole visible spectrum can be potentially created by mixing them at different ratios.

Figure 19:
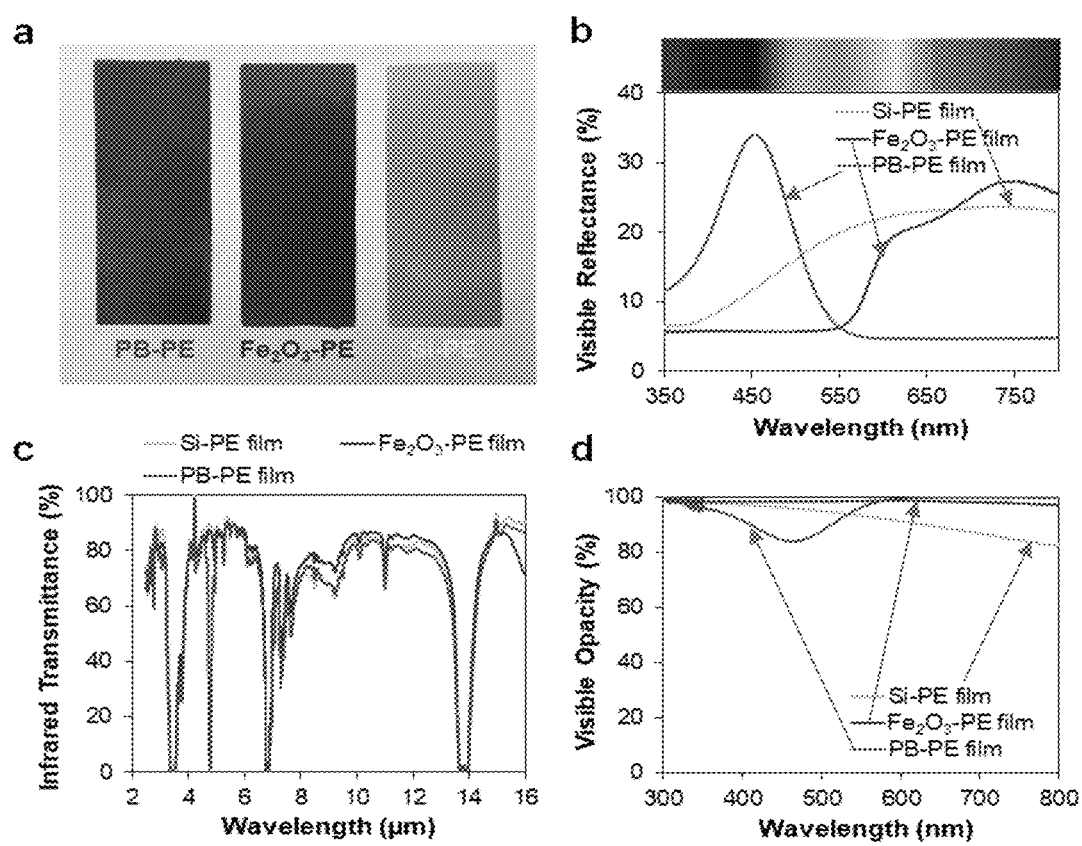
FIG. 19. (*a*) Photograph, (*b*) UV-VIS reflectance, (*c*) FTIR transmittance and (*d*) visible opacity spectra of pigment nanoparticle-mixed polyethylene composite films.

A compounding process was employed to mechanically mix the nanoparticles with melted polyethylene pellets at about 180° C., which produces substantially uniform inorganic solid-polymer composites. With an optimized mass ratio of about 1% nanoparticles, the composites maintain good thermal processability for molding into arbitrary shapes and satisfactory optical properties for both visible and infrared ranges. Because of the substantially uniform distribution of pigment nanoparticles inside the polyethylene polymer matrix, the molded PB-PE, $Fe_2O_3$-PE and Si-PE composite films with a thickness of about 100 μm show uniform and intense colors of blue, red and yellow, respectively (FIG. 19a). The ultraviolet-visible (UV-VIS) spectroscopy measurement of the composite films reveals dominant reflection wavelengths at about 450 nm, about 600 nm and about 750 nm, matching well to the original colors of Prussian blue, iron oxide and silicon nanoparticles, respectively (FIG. 19b). The strong reflection and absorption of visible light lead to high opacity (specified as 1—specular transmittance) of more than about 80% in the visible range (FIG. 19d), which satisfies the basic function of clothing in preventing the object behind the textile from being recognized. Furthermore, in the infrared region, the composites all show high transparency of about 80% (FIG. 19c), allowing the body radiation heat to transmit into the environment for achieving the radiative cooling effect.

Figure 20:
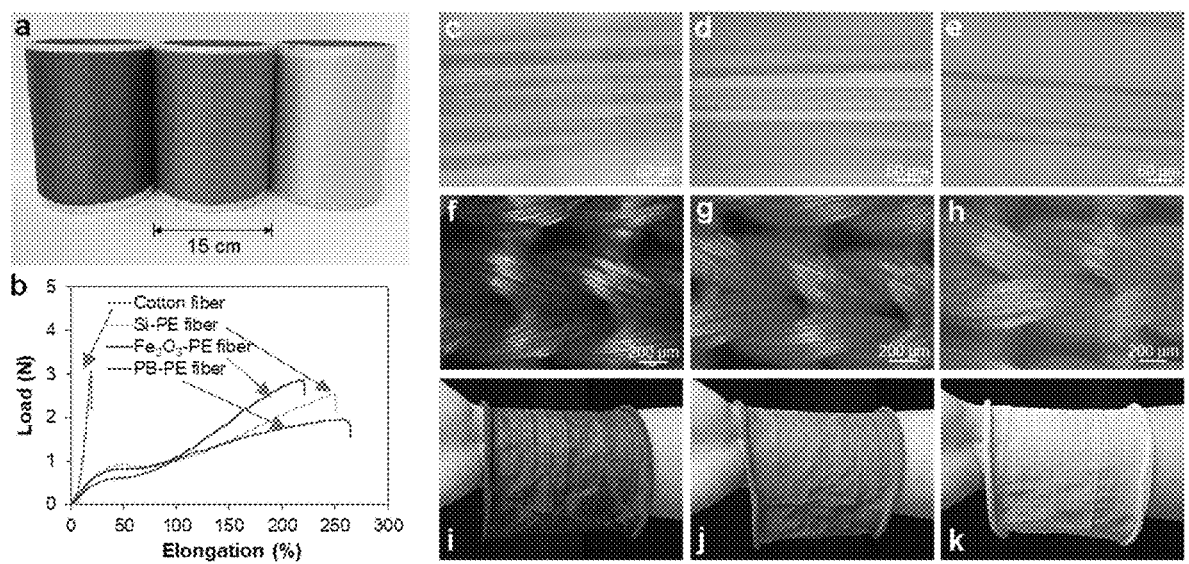
FIG. 20. (*a*) Photograph of three spools of colored polyethylene fibers produced by industrial extrusion. (*b*) Tensile strength test demonstrates that the colored polyethylene fibers have comparable tensile strength as cotton. Optical micrographs of the extruded fibers for (*c*) blue PB-PE, (*d*) red $Fe_2O_3$-PE and (*e*) yellow Si-PE. (*f-h*) Optical micrographs showing the knitting pattern and (*i-k*) photographs of the knitted textiles with good wearability.
Figure 21:
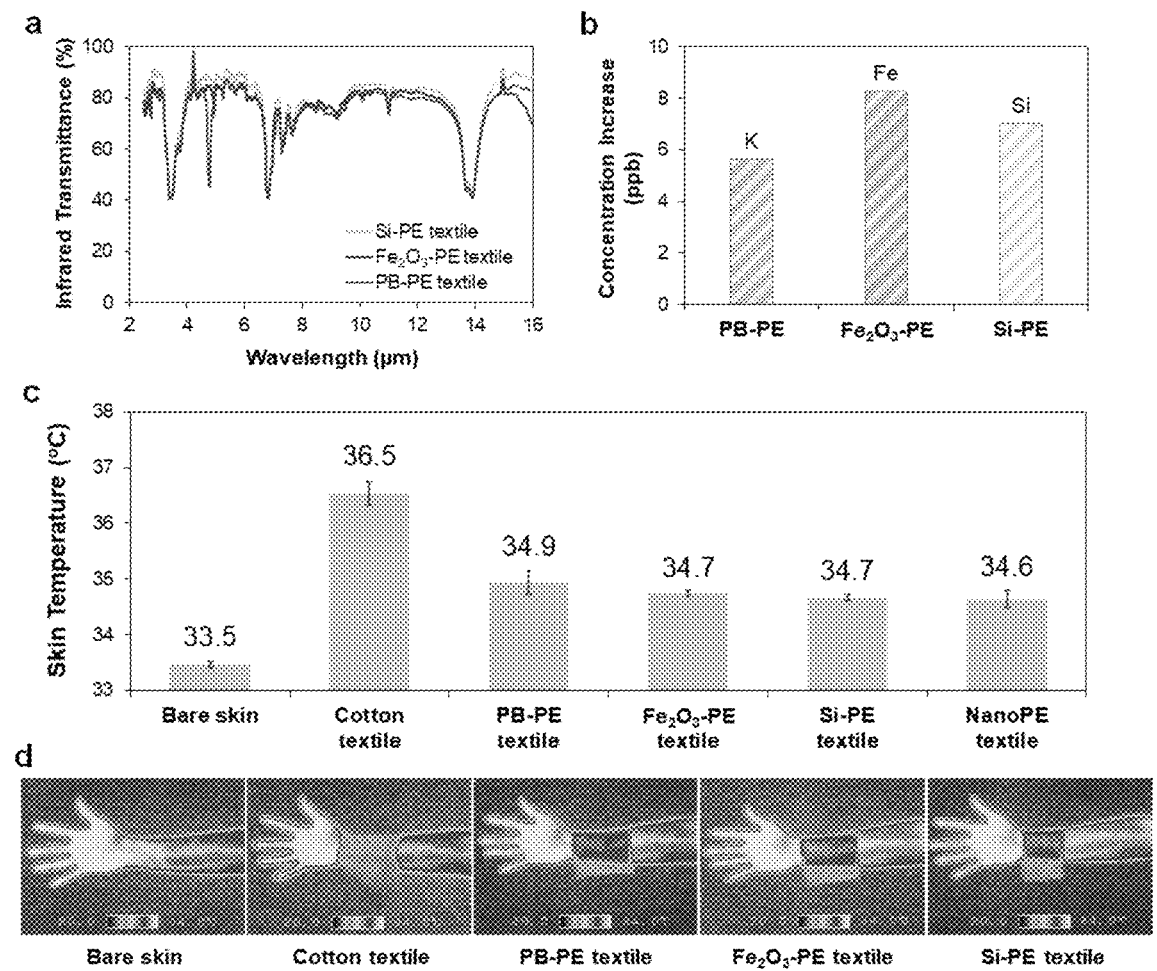
FIG. 21. (*a*) Measured total FTIR transmittance of colored polyethylene textiles. (*b*) Chart showing the negligible (ppb level) concentration increase of respective metal ions in water after washing the colored polyethylene textiles. (*c*) Comparison of the temperatures measured with bare and textile covered skin-simulating heaters. Textile samples include cotton, PB-PE, $Fe_2O_3$-PE, Si-PE and nanoporous polyethylene (nanoPE). (*d*) Infrared images of the bare skin and the human skin covered with cotton, PB-PE, $Fe_2O_3$-PE and Si-PE textiles.

Further demonstration is made of the extrusion of the colored polyethylene composites into multi-filament yarns using a high throughput melt spinning machine (FIG. 20a). The extruded yarn each is composed of 19 mono-filament fibers in diameter of about 30 to about 50 μm, as revealed by the optical microscope images in FIG. 20c-e. It is also evident that the pigment nanoparticles are substantially uniformly embedded inside the fibers. In addition, mechanical strength tests show that the colored polyethylene composite yarns can sustain a maximum tensile force of about 1.9 to about 2.8 N, which is comparable to the cotton yarn used in normal clothing fabrics (FIG. 20b). The mechanical strength allowed further knitting of the yarns into large-scale interlaced fabrics with good breathability, softness and mechanical strength (FIG. 20f-k). With the incorporation of interlaced knitting pattern, the colored polyethylene composite fabrics still show high infrared transmittance of about 80% (FIG. 21a), which is about the same as that of the planar solid films shown in FIG. 19c. Furthermore, the stability and durability of the colored polyethylene fabrics was evaluated by measuring the Fe, K and Si ion concentrations in the water before and after washing using inductively coupled plasma mass spectrometry (FIG. 21b). The negligible change of the ion concentrations confirms that the $Fe_2O_3$, Prussian blue and Si nanoparticles are firmly wrapped by the polyethylene polymer matrix, which can sustain the washing cycles and maintain the original color without releasing pigment nanoparticles into the water.

Finally, characterization is made of the thermal performance of the colored polyethylene textiles. A rubber insulated flexible heater was used to simulate the heat generation of the skin, and its temperature response was recorded when covered with different textile samples. The whole set-up was enclosed in a chamber, and the surrounding air temperature inside the chamber was maintained substantially constant at about 25° C. At a heating power density of about 80 W m$^{-2}$, which is comparable to the human body metabolic heat generation rate, the bare skin heater showed a temperature of about 33.5° C. When the skin heater was covered with a normal cotton textile, the skin temperature increased to about 36.5° C. (FIG. 21c). When covered with the PB-PE, $Fe_2O_3$-PE and Si-PE textiles, the skin temperatures were measured in the range of about 34.7 to about 34.9° C., demonstrating their capability to passively cool the human body by about 1.6 to about 1.8° C. as compared to cotton. An infrared camera is used to visualize and validate the radiative cooling effect while wearing the colored polyethylene textiles on the human skin (FIG. 21d). The comparison under thermal imaging clearly illustrates that the colored polyethylene textiles allow much better transmission of the body radiation heat to the environment than the normal cotton textile.

In summary, this example demonstrates an improved approach based on inorganic pigment nanoparticles for large-scale fabrication of visible-colored and infrared-transparent textiles, which can allow more efficient dissipation of human body radiation heat while exhibiting attractiveness in diverse colors as comparative textiles. The pigment materials including Prussian blue, iron oxide and silicon were found to satisfy all the conditions of negligible IR absorption, non-toxicity and low cost, which can generate the primary colors of blue, red and yellow, respectively. Different colors spreading over the whole visible spectrum can be potentially created by mixing these three primary colors at different ratios. Through large-scale compounding, extrusion and knitting processes with optimized nanoparticle concentration and size, the as-fabricated composite textiles show intense visible colors, high infrared transparency of about 80%, passive cooling effect of about 1.6 to about 1.8° C. and good washing stability. The approach presented here solves a key bottleneck in the coloration of radiative textiles to help to move toward application of energy-efficient and cost-effective thermal-managing wearable technologies.

Materials and Methods:

Textile Fabrication.

The coloration of polyethylene was made by mixing the respective inorganic solid pigment nanoparticles, such as Prussian blue (ACROS Organics), iron oxide (Sigma Aldrich, 99%) and silicon (MTI Corporation, 100 nm, 99%), with melted high-density polyethylene pellets (melt index: about 2.2 g per 10 min, Sigma Aldrich) at about 180° C. using a twin-screw compounder (Polymers Center of Excellence). The optimized mass ratio between nanoparticle and polyethylene is about 1:100. The nanoparticle-mixed polyethylene composites were then extruded into fibers using a multi-filament melt-spinning machine (Hills Inc.). Textile knitting was conducted using a FAK sampler knitting machine by Textile Technology Center at Gaston College.

Material Characterization.

The photographs of the extruded fibers and knitted textiles were taken with an optical microscope (Olympus). The SEM images were taken by an FEI XL30 Sirion SEM (about 5 kV). The infrared absorbance and transmittance were measured by an FTIR spectrometer (Model 6700, Thermo Scientific) accompanied with a diffuse gold integrating sphere (PIKE Technologies). The visible reflection and opacity were measured by an ultraviolet-visible spectrometer (Agilent, Cary 6000i).

Thermal measurement. The skin was simulated using a rubber insulated flexible heater (Omega, about 72 cm$^2$) which was connected to a power supply (Keithley 2400). A ribbon type hot junction thermocouple (about 0.3 mm in diameter, K-type, Omega) was in contact with the top surface of the simulated skin to measure the skin temperature. A guard heater and an insulating foam were placed below the simulated skin heater to ensure that the heat generated by the skin heater transfers selectively to the ambient. The temperature of the guard heater was set the same as the skin heater, so downward heat conduction to the table was averted. The whole device was enclosed in a chamber, and the ambient temperature inside the chamber was controlled to be substantially constant at about 25° C. The power density of the skin heater is set to be substantially constant at about 80 W m$^{-2}$, which rendered the skin temperature of about 33.5° C. at the ambient temperature of about 25° C. When the skin was covered by the textile sample (about 5×about 5 cm²), measurement is made of the steady-state skin temperature response while the ambient temperature was maintained at about 25° C. The thermal images were taken by a calibrated thermal camera (Mikro-SHOT, Mikron).

Mechanical Test.

The tensile strength test was measured by Instron 5565. The yarn samples were cut into the length of about 4 cm. The gauge distance was about 2 cm long, and the displacement rate was kept at about 10 mm min⁻¹.

Washing Test.

The knitted textiles were washed in clean water (about 80 ml) under stirring for about 30 min. The water before and after wash was collected, and then tested using inductively coupled plasma mass spectrometry (ICP-MS) to quantify the amount of metal ions (K, Fe and Si for Prussian blue, iron oxide and silicon, respectively) that were released from the textile samples during washing.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. A textile comprising:
   a matrix comprising at least one of polyethylene or polypropylene; and
   particulate fillers dispersed within the matrix, wherein the particulate fillers have an average particle size in a range of about 500 nm to about 900 nm, and a number density of the particulate fillers is 0.1 to 0.5 µm⁻³, wherein the particulate fillers include at least one of potassium bromide, cesium iodide, potassium chloride, or sodium chloride,
   wherein the textile has a transmittance of infrared radiation at a wavelength of 9.5 µm of at least 40%, and
   wherein the textile has a weighted average reflectivity of radiation over a wavelength range of 0.3 µm to 2 µm of at least 40%.

2. The textile of claim 1, wherein the average particle size of the particulate fillers is in a range of about 500 nm to 800 nm.

3. The textile of claim 1, wherein a difference in refractive index between the particulate fillers and the matrix is at least ±5% with respect to a refractive index of the matrix.

4. The textile of claim 1, wherein the transmittance of infrared radiation at the wavelength of 9.5 µm is at least 60%.

5. The textile of claim 1, wherein the weighted average reflectivity of radiation over the wavelength range of 0.3 µm to 2 µm is at least 60%.

6. The textile of claim 1, wherein the matrix is porous.

7. The textile of claim 6, wherein a volume percentage of pores within the matrix is at least 5%.

8. The textile of claim 6, wherein pores within the matrix have an average pore size in a range of 10 nm to 4000 nm.

9. The textile of claim 1, wherein the matrix and the particulate fillers form a fiber.

10. The textile of claim 1, wherein the matrix and the particulate fillers form a film.

11. A textile comprising:
    a matrix comprising at least one of polyethylene or polypropylene; and
    particulate fillers dispersed within the matrix, wherein the particulate fillers have an average particle size in a range of about 500 nm to about 900 nm, and a number density of the particulate fillers is 0.1 to 0.5 µm⁻³, wherein the particulate fillers include at least one of potassium bromide, cesium iodide, potassium chloride, or sodium chloride,
    wherein the textile has a transmittance of infrared radiation at a wavelength of 9.5 µm of at least 40%, and
    wherein the textile has a peak in reflectivity at a wavelength in the visible range corresponding to a particular color.

12. A method of regulating a temperature of a human body, comprising:
placing the textile of any one of claims 1, 4, and 3-11 adjacent to the human body.

* * * * *